(12) United States Patent
Urashima et al.

(10) Patent No.: US 7,821,626 B2
(45) Date of Patent: Oct. 26, 2010

(54) ANGLE MEASURING DEVICE AND METHOD

(75) Inventors: Takashi Urashima, Osaka (JP);
Kazumasa Takata, Osaka (JP);
Tomotaka Furuta, Osaka (JP);
Hidetoshi Utsuro, Osaka (JP)

(73) Assignee: Panasonic Corporation, Osaka (JP)

( * ) Notice: Subject to any disclaimer, the term of this patent is extended or adjusted under 35 U.S.C. 154(b) by 189 days.

(21) Appl. No.: 11/994,077

(22) PCT Filed: Sep. 20, 2006

(86) PCT No.: PCT/JP2006/318612

§ 371 (c)(1),
(2), (4) Date: Dec. 27, 2007

(87) PCT Pub. No.: WO2007/034824

PCT Pub. Date: Mar. 29, 2007

(65) Prior Publication Data

US 2009/0231573 A1 Sep. 17, 2009

(30) Foreign Application Priority Data

Sep. 21, 2005 (JP) ............................. 2005-273314

(51) Int. Cl.
*G01C 1/00* (2006.01)
(52) U.S. Cl. .................... 356/141.1; 356/139.1
(58) Field of Classification Search .............. 356/139.1, 356/141.01, 141.5, 141.2; 359/204.5, 566
See application file for complete search history.

(56) References Cited

U.S. PATENT DOCUMENTS

| | | | |
|---|---|---|---|
| 5,011,287 A | 4/1991 | Mino | |
| 6,809,829 B1 * | 10/2004 | Takata et al. | 356/520 |
| 6,882,409 B1 * | 4/2005 | Evans et al. | 356/4.01 |
| 7,180,590 B2 * | 2/2007 | Bastue et al. | 356/326 |
| 2004/0213109 A1 | 10/2004 | Ogata et al. | |
| 2006/0164630 A1 * | 7/2006 | Hofbauer | 356/141.1 |

FOREIGN PATENT DOCUMENTS

JP 60-71903 4/1985

(Continued)

OTHER PUBLICATIONS

Patent Cooperation Treaty (PCT) International Preliminary Report on Patentability, Mar. 26, 2008.

(Continued)

*Primary Examiner*—Isam Alsomiri
(74) *Attorney, Agent, or Firm*—Wenderoth, Lind & Ponack, L.L.P.

(57) ABSTRACT

By diffracting light emitted from a collimator lens into lights of different orders by a transmission diffraction grating, applying the diffracted lights to a flat surface of an object, forming the light that has been reflected on the flat surface of the object and thereafter retransmitted through the transmission diffraction grating into an image in a position located apart from the optical axis of the outgoing light and measuring the angle of the object with respect to the optical axis of the collimator lens using the image location and the order of the light formed as the image, the angle in a wide range can be measured with a high resolving power.

15 Claims, 17 Drawing Sheets

FOREIGN PATENT DOCUMENTS

| | | |
|---|---|---|
| JP | 63-144206 | 6/1988 |
| JP | 9-229650 | 9/1997 |
| JP | 10-214546 | 8/1998 |
| JP | 2001-133232 | 5/2001 |
| JP | 2003-83731 | 3/2003 |
| JP | 2005-61981 | 3/2005 |

OTHER PUBLICATIONS

International Search Report issued Nov. 21, 2006 in the International (PCT) Application of which the present application is the U.S. National Stage.

* cited by examiner

ANGLE MEASURING DEVICE AND METHOD

BACKGROUND OF THE INVENTION

1. Technical Field

The present invention relates to an angle measuring device and measuring method of an object utilizing an optical system.

2. Description of Related Art

As a related angle measuring method utilizing an optical system, there is, for example, an optical lever system to measure an angle by using the inclination of a laser light. This utilizes the phenomenon that, when a laser light is made incident on a mirror attached to the object, an angle of deviation of reflected light becomes 2θ when the mirror is inclined by θ.

FIG. 14 is a schematic structural view of a related angle measuring device that employs the optical lever system. In FIG. 14, laser light emitted from a light source 501 is reflected by a beam splitter 502 and thereafter transmitted through a quarter wavelength plate 503, formed into parallel light by a collimator lens 504 and applied to an object 505. The reflected light reflected on the object 505 is condensed by the collimator lens 504, transmitted through the quarter wavelength plate 503, transmitted through the beam splitter 502 and formed as an image on a photodetector 506.

With the above construction, the angle of the object 505 is measured according to the image location in the photodetector 506. For example, when an angle formed between the optical axis S of the collimator lens 504 and the object 505 is zero, i.e., if the image location when a flat surface 505a of the object 505 is arranged generally perpendicularly to the optical axis S is previously known, the angle of the object 505 is measured from a mutual relation between the image location and the measurement position.

As such an angle measuring method of the optical lever system, there is a method disclosed in, for example, Japanese patent application publications No. 2001-133232 and No. 2003-083731.

SUMMARY OF THE INVENTION

The related construction, in which the laser light reflected on the object does not enter the photodetector when the angle of the object is increased, therefore has an issue that the angle cannot be measured. For example, it is possible to measure the angle by increasing the movable scope with the light receiving surface of the photodetector enlarged or with the photodetector made movable even when the angle is increased. However, according to the optical device that has a number of measuring mechanisms in the neighborhoods of the optical elements, a method for achieving these with a smaller mechanism and a mechanism of a smaller movable scope is demanded.

Accordingly, an object of the present invention is to improve the issues described above. For the above purposes, it is an object to provide an angle measuring device and method for measuring the angle of the object with a small mechanism or a mechanism of a small movable scope with a high resolving power within a wide angle range in measuring the angle of the object utilizing an optical system.

In accomplishing the objects, the present invention is constructed as follows.

According to a first aspect of the present invention, there is provided an angle measuring device comprising:

a light source;

a photodetector;

a collimator lens for forming light emitted from the light source into parallel light parallel to its optical axis;

a transmission diffraction grating which is placed on the optical axis, for making the parallel light pass therethrough and diffracting the light into lights of different orders;

an optical system for forming diffracted light reflected on a flat surface of an object arranged oppositely to the transmission diffraction grating into an image on the photodetector after making the light pass through the transmission diffraction grating; and a measuring device for measuring an angle of the object with respect to the optical axis on a basis of an image location on the photodetector and the order of the light formed as an image.

According to a second aspect of the present invention, there is provided the angle measuring device as defined in the first aspect, further comprising:

a rotator for rotating the object so that an angle of the flat surface with respect to the optical axis is changed; and a controller which has order specifying information to relate a rotation position of the object by the rotator with each order of the diffracted light formed as an image on the photodetector, for specifying the order of the light formed as an image by rotation position information of the object and the order specifying information.

According to a third aspect of the present invention, there is provided the angle measuring device as defined in the second aspect, wherein the rotator is a device for rotating the object along a circular arc centered on the transmission diffraction grating.

According to a fourth aspect of the present invention, there is provided the angle measuring device as defined in the second aspect, wherein the rotator is a device for rotating the object around a center of rotation arranged inside the object.

According to a fifth aspect of the present invention, there is provided the angle measuring device as defined in the first aspect, further comprising:

a light shielding member provided with a light transmitting portion, which is placed between the flat surface of the object and the transmission diffraction grating and which comprises a light passing portion, the light shielding member making part of the diffracted lights of the orders pass through the light passing portion and shielding the other diffracted lights;

a shifter for shifting the light shielding member and the transmission diffraction grating relatively in a direction intersecting the optical axis; and a controller which has order specifying information to relate a relative displacement position of the light shielding member by the shifter with each order of the diffracted light formed as an image on the photodetector, for specifying the specific order of the diffracted light by relative displacement position information of the light shielding member and the order specifying information.

According to a sixth aspect of the present invention, there is provided the angle measuring device as defined in the fifth aspect, wherein the shifter is a device for shifting the light shielding member along a circular arc centered on the transmission diffraction grating.

According to a seventh aspect of the present invention, there is provided the angle measuring device as defined in the fifth aspect, wherein the light passing portion of the light shielding member is a slit-shaped opening portion, where a slit of a width equal to a width of the parallel light transmitted through the transmission diffraction grating is formed.

According to an eighth aspect of the present invention, there is provided an angle measuring device comprising:

a light source;

a photodetector;

a collimator lens for forming light emitted from the light source into parallel light parallel to its optical axis;

a reflection diffraction grating which is placed on the optical axis and a flat surface of an object oppositely to the collimator lens, for reflecting applied parallel light by diffracting the light into lights of different orders;

an optical system for forming the reflected diffracted light on the photodetector; and measuring means for measuring an angle of the object with respect to the optical axis on a basis of an image location on the photodetector and the order of the light formed as an image.

According to a ninth aspect of the present invention, there is provided the angle measuring device as defined in the first or fifth aspects, further comprising:

an angle calculating section in which, assuming that a focal distance of the collimator lens is f, a wavelength of the parallel light emitted from the lens is λ, an interval pitch of groove portions of the diffraction grating is d, a specific order of the diffracted light is m, and a distance between the optical axis and the image location on the photodetector is l, then an angle φ of the object with respect to the optical axis of the lens is calculated by the equation:

$$\phi = \frac{\sin^{-1}\left(m\left(\frac{\lambda}{d}\right)\right) + \sin^{-1}\left(m\left(\frac{\lambda}{d}\right) + \sin\left(\tan^{-1}\left(\frac{l}{f}\right)\right)\right)}{2}$$

According to a tenth aspect of the present invention, there is provided an angle measuring method comprising:

transmitting parallel light through a diffraction grating and diffracting the light into lights of different orders by the diffraction grating;

reflecting the diffracted light on a flat surface of an object;

making the reflected diffracted light pass through the diffraction grating and then forming the light into an image; and measuring an angle of the object with respect to an optical axis of the parallel light on a basis of an image location and the order of the light formed as an image.

According to an eleventh aspect of the present invention, there is provided the angle measuring method as defined in the tenth aspect, wherein a zeroth-order diffracted light is formed as an image in a state in which the optical axis and the flat surface of the object are arranged perpendicular to each other, thereafter the diffracted lights whose orders are successively increased by one are each formed as an image by displacing the flat surface and the diffraction grating relatively to each other to change the angle of the flat surface with respect to the optical axis, by which order specifying information which relates a relative displacement position of the object with each order of the diffracted light formed as an image is obtained, the order of the diffracted light formed as an image is specified by the order specifying information and relative displacement position information of the object, and the angle of the object is measured on a basis of an image location and the specified order.

According to a twelfth aspect of the present invention, there is provided the angle measuring method as defined in the eleventh aspect, wherein the relative displacement of the object with respect to the optical axis is to displace the object along a circular arc centered on the diffraction grating.

According to a 13th aspect of the present invention, there is provided the angle measuring method as defined in the eleventh aspect, wherein the relative displacement of the object with respect to the optical axis is to rotate the object around a center of rotation arranged inside the object.

According to a 14th aspect of the present invention, there is provided the angle measuring method as defined in the tenth aspect, wherein a light shielding member provided with a light transmitting portion, which is placed between the flat surface of the object and the diffraction grating and which comprises a light passing portion, the light shielding member making part of the diffracted lights of the orders pass through the light passing portion and shielding the other diffracted lights, is moved in a direction intersecting the optical axis with respect to the diffraction grating while successively forming the diffracted lights of the orders each into an image and order specifying information that relates a relative displacement position of the light shielding member with each order of the diffracted light formed as an image is to obtained, and the specific order of the diffracted light is specified by the obtained order specifying information and relative displacement position information of the light shielding member, and the angle of the object is measured on a basis of an image location and the specified order.

According to a 15th aspect of the present invention, there is provided the angle measuring method as defined in the 14th aspect, wherein the relative displacement of the light shielding member with respect to the diffraction grating is to move the light shielding member along a circular arc centered on the diffraction grating.

According to a 16th aspect of the present invention, there is provided an angle measuring method comprising:

reflecting parallel light applied to a diffraction grating placed on a flat surface of an object and diffracting the light into lights of different orders by the diffraction grating;

condensing the reflected diffracted light and forming the light into an image; and measuring an angle of the object with respect to an optical axis of the parallel light on a basis of an image location of the light and the order of the light.

According to a 17th aspect of the present invention, there is provided the angle measuring method as defined in the tenth or 16th aspects, wherein formation of the parallel light and the condensation and image formation of the diffracted light of the specific order are performed by using a collimator lens, and assuming that a focal distance of the collimator lens is f, a wavelength of the parallel light emitted from the lens is λ, an interval pitch of groove portions of the diffraction grating is d, a specific order of the diffracted light is m, and a distance between the optical axis and the image location is l, then an angle φ of the object with respect to the optical axis is calculated by the equation:

$$\phi = \frac{\sin^{-1}\left(m\left(\frac{\lambda}{d}\right)\right) + \sin^{-1}\left(m\left(\frac{\lambda}{d}\right) + \sin\left(\tan^{-1}\left(\frac{l}{f}\right)\right)\right)}{2}$$

According to the angle measuring device and method of the present invention, the parallel light applied to the object is made to diverge into diffracted lights of different orders utilizing the diffraction grating, and the diverged diffracted lights are applied to the object. Concurrently, the reflected lights are condensed and formed as an image. Therefore, even if the object has an angle of a wide range, the angle of the object can be measured by a small mechanism or a mechanism of a small movable scope. Concretely, in contrast to the fact that the range measurable by the conventional optical lever system falls within positive and negative several minutes to several degrees, the angle measuring device and method of the present invention can perform the measurement within a range of positive and negative several tens of degrees.

BRIEF DESCRIPTION OF DRAWINGS

Aspects and features of the present invention will become clear from the following description taken in conjunction with the preferred embodiments thereof with reference to the accompanying drawings, in which.

BRIEF DESCRIPTION OF THE PREFERRED EMBODIMENT

Figure 1:
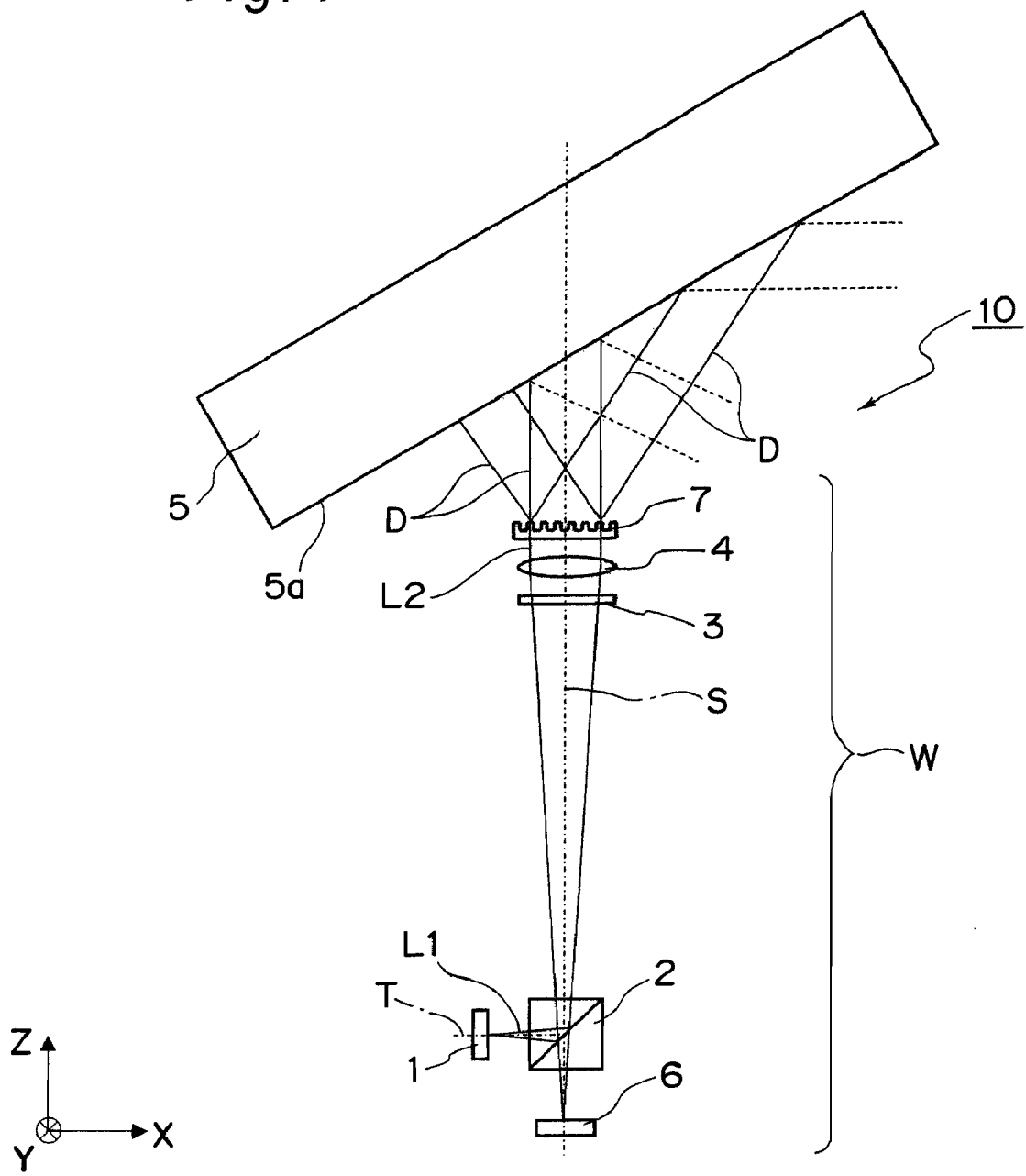
FIG. 1 is a schematic structural view of an angle measuring device according to a first embodiment of the present invention.

In the description of the present invention, like components are denoted by like reference numerals in the accompanying drawings.

Embodiments according to the present invention will be described in detail below using the drawings.

The First Embodiment

FIG. 1 is a schematic structural view of an angle measuring device 10 according to the first embodiment of the present invention.

As shown in FIG. 1, the angle measuring device 10 comprises a light source 1 that emits laser light, a beam splitter 2 that reflects the laser light so as to direct the laser light emission direction along an optical axis S, a quarter wavelength plate 3 that is placed adjacent to the beam splitter 2 on the optical axis S and transmits the laser light, and a photodetector 6 on which the reflected light from an object 5 is condensed by a collimator lens 4 and formed as an image. Moreover, as shown in FIG. 1, the object 5 that has a flat surface 5a is placed oppositely to a transmission diffraction grating 7 above the transmission diffraction grating 7 in the figure on the optical axis S. It is noted that the optical axis S is positioned at the center of, for example, the beam splitter 2, the quarter wavelength plate 3, the collimator lens 4, the transmission diffraction grating 7 and the photodetector 6, and the components are arranged so that the optical axis S is generally perpendicular to a laser light emission optical axis T of the light source 1. The angle measuring device 10 of the present first embodiment is a device to measure the disposition angle of the object 5 with respect to the optical axis S by measuring the angle of the flat surface 5a of the object 5.

Figure 2:
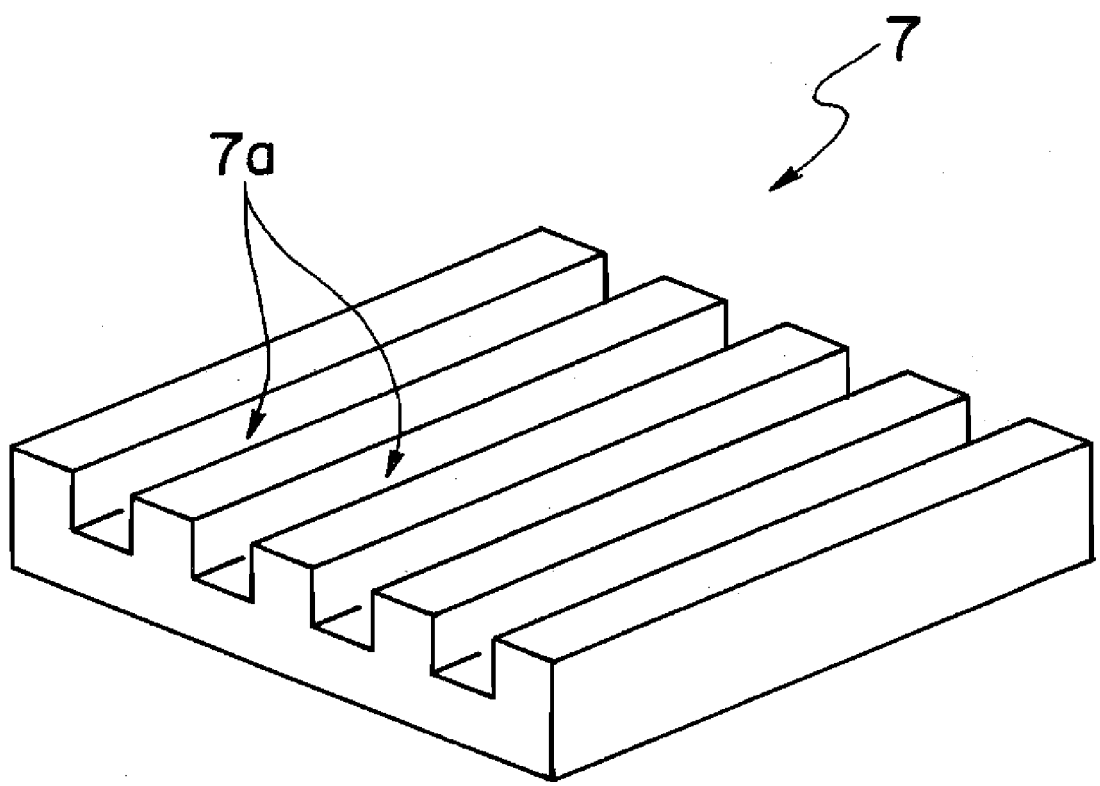
FIG. 2 is a schematic perspective view of a diffraction grating provided for the angle measuring device of FIG. 1.

FIG. 2 shows a schematic perspective view of the transmission diffraction grating 7. As shown in FIG. 2, the transmission diffraction grating 7 is formed generally in a plate-like shape and formed so that a plurality of linear groove portions 7a are formed on the illustrated upper surface side, and the illustrated lower surface side is a generally flat surface. Moreover, the transmission diffraction grating 7 is formed of a light transmitting optical material and has a function to diffract the transmitted light into lights of different orders when passing through the surface of each of the groove portions 7a. As shown in FIG. 1, the generally plate-shaped transmission diffraction grating 7 is arranged so as to be generally perpendicular to the optical axis S, i.e., so that parallel light from the collimator lens 4 is generally perpendicularly incident on the grating.

In the angle measuring device 10 of FIG. 1 having the above construction, laser light L1 emitted from the light source 1 is reflected so as to be along the optical axis S upwardly in the figure by the beam splitter 2 and transmitted through the quarter wavelength plate 3. The light transmitted through the quarter wavelength plate 3 is formed into parallel light L2 by the collimator lens 4 and made incident on the transmission diffraction grating 7 arranged so as to be perpendicular to the parallel light L2. The parallel light L2 is made to diverge into diffracted lights D of different orders by the transmission diffraction grating 7 and applied to the flat surface 5a of the object 5. Although the greater part of the diffracted lights D reflected on the flat surface 5a of the object 5 scatters without being incident on the transmission diffraction grating 7, a diffracted light D of at least one order of the diffracted lights D reflected on the flat surface 5a of the object 5 is reincident on the transmission diffraction grating 7. The light D is rediffracted by the transmission diffraction grating 7, condensed by the collimator lens 4, transmitted through the quarter wavelength plate 3 and the beam splitter 2 and formed as an image on the photodetector 6. As described above, it is noted that an optical system W is constituted by arranging the components in the prescribed positional relations so that the laser light L1 emitted from the light source 1 is finally formed as the diffracted light D in the form of an image on the photodetector 6 via the beam splitter 2, the quarter wavelength plate 3, the collimator lens 4, the transmission diffraction grating 7, the object 5, the transmission diffraction grating 7, the collimator lens 4, the quarter wavelength plate 3 and the beam splitter 2.

Figure 3A:
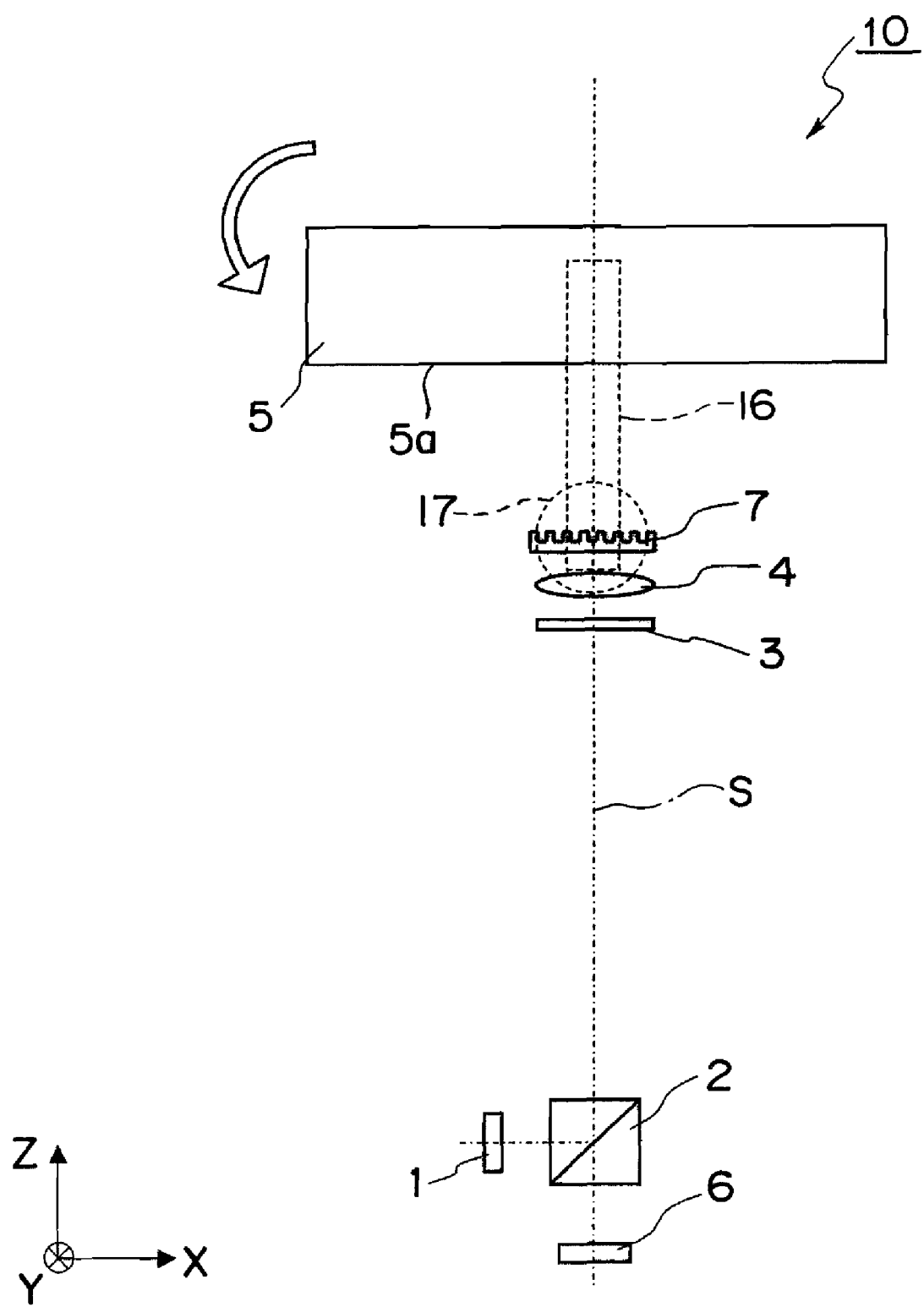
FIG. 3A is a schematic side view in the XZ plane of the angle measuring device of the first embodiment.
Figure 3B:
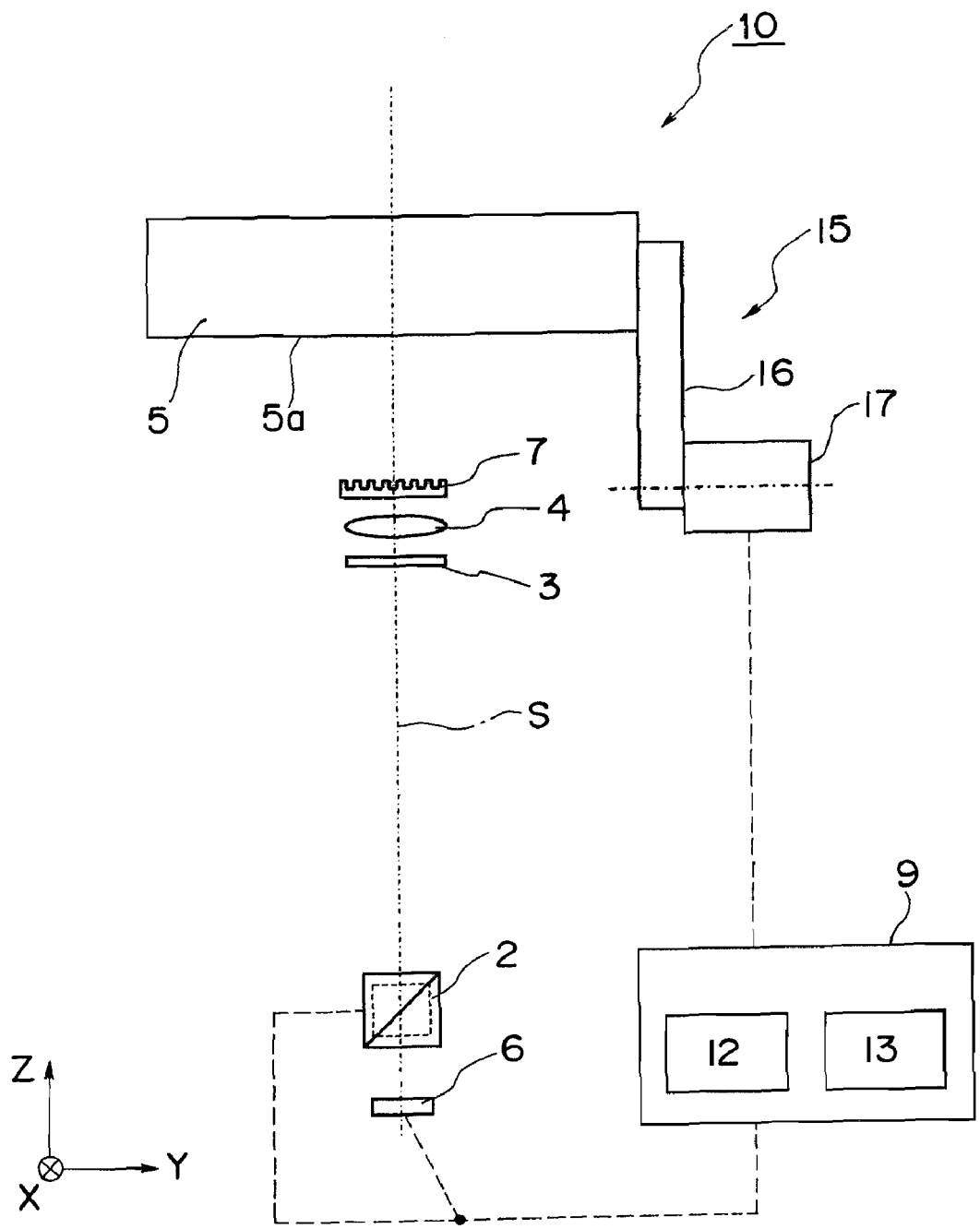
FIG. 3B is a schematic side view in the YZ plane of the angle measuring device of the first embodiment.

FIGS. 3A and 3B are structural views showing more in detail the schematic construction of the angle measuring device 10 of the present first embodiment constructed as above. FIG. 3A is a schematic structural view showing the XZ plane of the angle measuring device 10, and FIG. 3B is a schematic structural view showing the YZ plane. It is noted that the X axis, the Y axis and the Z axis are arranged mutually perpendicularly, and the optical axis S is arranged along the Z axis.

As shown in FIGS. 3A and 3B, a retainer 15 that retains the object 5 is provided for the angle measuring device 10. The retainer 15 has a shaft 16 to support the object 5, and a motor 17 that changes the angle of inclination of the object 5 with respect to the optical axis S (i.e., the Z axis) by rotationally driving the shaft 16. As shown in FIG. 3B, the center of rotation of the shaft 16 is arranged along the Y axis so as to generally coincide with, for example, the center of the transmission diffraction grating 7. Moreover, the retainer 15 is one example of the rotator or shifter.

Moreover, as shown in FIG. 3B, the angle measuring device 10 comprises an angle calculating section 12 that is one example of a measuring device for calculating the angle of the object 5 by a method as described later by obtaining image location information of the diffracted light formed as an image on the photodetector 6 from the photodetector 6, i.e., for measuring the angle, and a storage section 13 that stores and keeps order specifying information for specifying the order of the diffracted light in order to perform angle calculation processing as described later. In addition, a controller 9 that controls the laser light applying operation by the light source 1 and the driving operation of the motor 17 of the retainer 15 is provided.

A concrete example of the dimensions of the angle measuring device 10 constructed as above is described with reference to FIGS. 3A and 3B. The beam splitter 2 has a dimension of 20 mm in the X-axis direction and a dimension of 30 mm in the Z-axis direction in FIG. 3A. Both the distance between the light source 1 and the beam splitter 2 and the distance between the photodetector 6 and the beam splitter 2 are each 10 mm. The distance between the photodetector 6 and the collimator lens 4 is 300 mm. The effective diameter of the collimator lens 4 is 10 mm, and the focal distance f of the collimator lens 4 is f=300. The distance between the collimator lens 4 and the transmission diffraction grating 7 is 10 mm. The width in the X-axis direction of the diffraction grating 7 is 20 mm, and the pitch of the diffraction grating 7, i.e., the interval pitch of the groove portions 7a of the transmission diffraction grating 7 is 37 μm. The distance between the transmission diffraction grating 7 and the object 5 is 100 mm.

Next, a method for calculating the angle of the object 5 by using the information of the image location of the photodetector 6 in the angle measuring device 10 of the present first embodiment is described in concrete. It is noted that the calculation processing of the angle is performed by the angle calculating section 12 provided for the controller 9. For the description, a schematic explanatory view showing a state in which the parallel light is diffracted by the transmission diffraction grating 7 is shown in FIG. 4.

Figure 4:
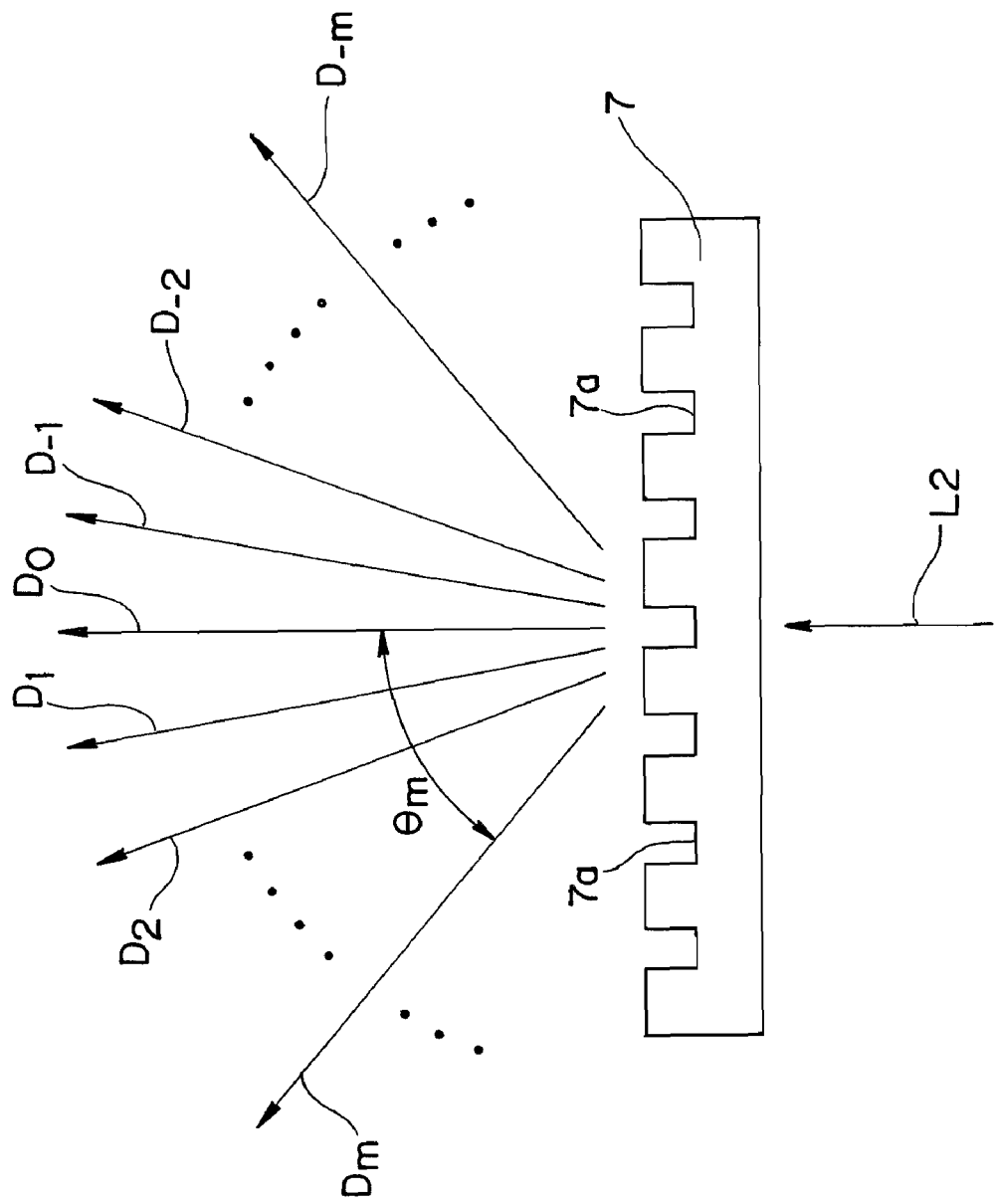
FIG. 4 is a schematic explanatory view showing a state in which parallel light is diffracted by a transmission diffraction grating of the first embodiment.

As shown in FIG. 4, when laser light emitted from the light source 1 is made incident as the parallel light L2 on the transmission diffraction grating 7, the parallel light L2 diverges into a plurality of diffracted lights D of different orders. In this case, the angle of an m-th order diffracted light $D_m$ at this time can be expressed by Equation (1).

$$\sin\theta_m = m(\lambda/d)(m=0, \pm 1, \pm 2, \ldots) \quad (1)$$

In the equation, $\theta_m$ is the angle of the m-th order diffracted light, $\lambda$ is the wavelength of the laser light (parallel light), d is the pitch of the transmission diffraction grating 7, and m is an integer. It is noted that the zeroth-order diffracted light is represented by $D_0$, the first-order diffracted light is represented by $D_1$, the second-order diffracted light is represented by $D_2$, the negative second-order diffracted light is represented by $D_2$, and the m-th order diffracted light is represented by $D_m$ in FIG. 4.

Figure 5:
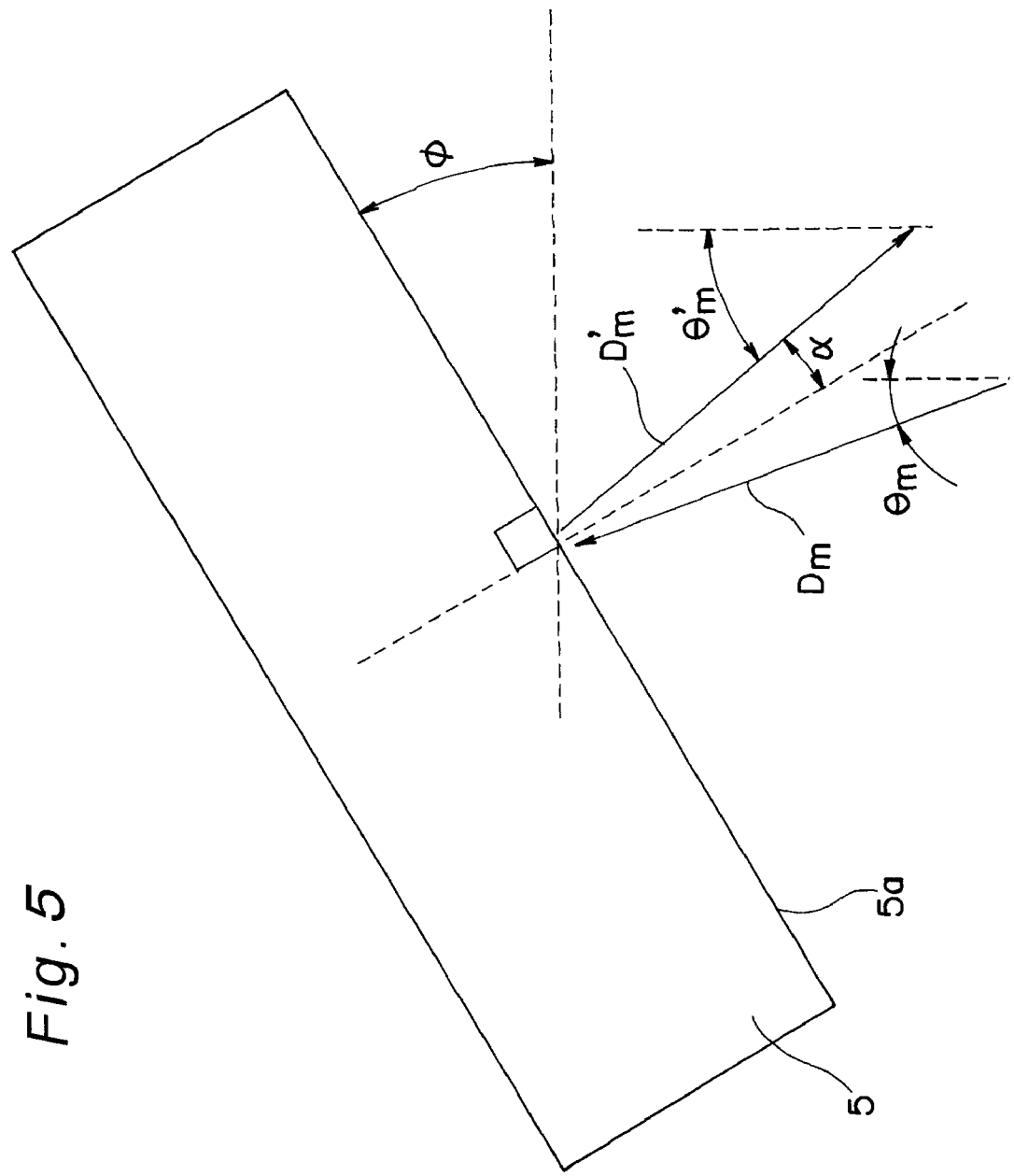
FIG. 5 is a schematic explanatory view showing a relation between the diffracted light and the reflected light in the angle measuring device of the first embodiment.

FIG. 5 is a schematic explanatory view showing the relation between the incident light (diffracted light) on the object 5 and the reflected light in the angle measuring device 10 of the present first embodiment.

As shown in FIG. 5, assuming that the angle of the incident light $D_m$ is $\theta_m$, the angle of the reflected light $D_m'$ is $\theta_m'$ and the incident angle on the object 5 is $\alpha$ when the m-th order diffracted light $D_m$ is reflected on the flat surface 5a of the object 5, then the relation: $\theta_m' - \theta_m = 2\alpha$ holds according to the low of reflection. Moreover, assuming that the angle of the object 5 is $\phi$, then the equation: $\phi = \theta_m + \alpha$ holds. Therefore, by substituting the above equation into $\alpha$, the equation: $\phi = (\theta_m + \theta_m')/2$ can be obtained. In this case, m can be obtained by adjusting a state in which the order m measured when the optical axis of the collimator lens 4 and the flat surface 5a of the object 5 are perpendicular to each other becomes 0 (zero) to the zero point at the time of measuring the angle to rotate the object 5 by the retainer 15 and thereby successively counting the subsequent orders. That is, by rotating the object 5 by the retainer 15, the information of the rotation position of the object 5 by the retainer 15 is obtained when the diffracted light $D_m$ of each order is formed as an image on the photodetector 6 (for example, formed as an image in the reference position of the photodetector 6) is obtained. As a result, the order m of each diffracted light and the rotation position information of the object 5 can be related with each other. The information related as described above becomes order specifying information, which is preparatorily obtained by the controller 9 and readably retained in the storage section 13. For example, by inputting the rotation position information of the retainer 15 that is retaining the object 5 to the controller 9 when the angle of the object 5 is measured and reading the order specifying information related to the rotation position information by the angle calculating section 12 from the storage section 13, the order of the diffracted light formed as an image on the photodetector 6 can be specified.

When the center of rotation of the object 5, i.e., the center of rotation of the retainer 15 is located in the diffraction grating 7 as in the angle measuring device 10 of FIG. 3B, it can be considered that the reflected light can reliably be measured if the flat surface 5a of the object 5 has a width of not smaller than 20 mm.

Figure 6A:
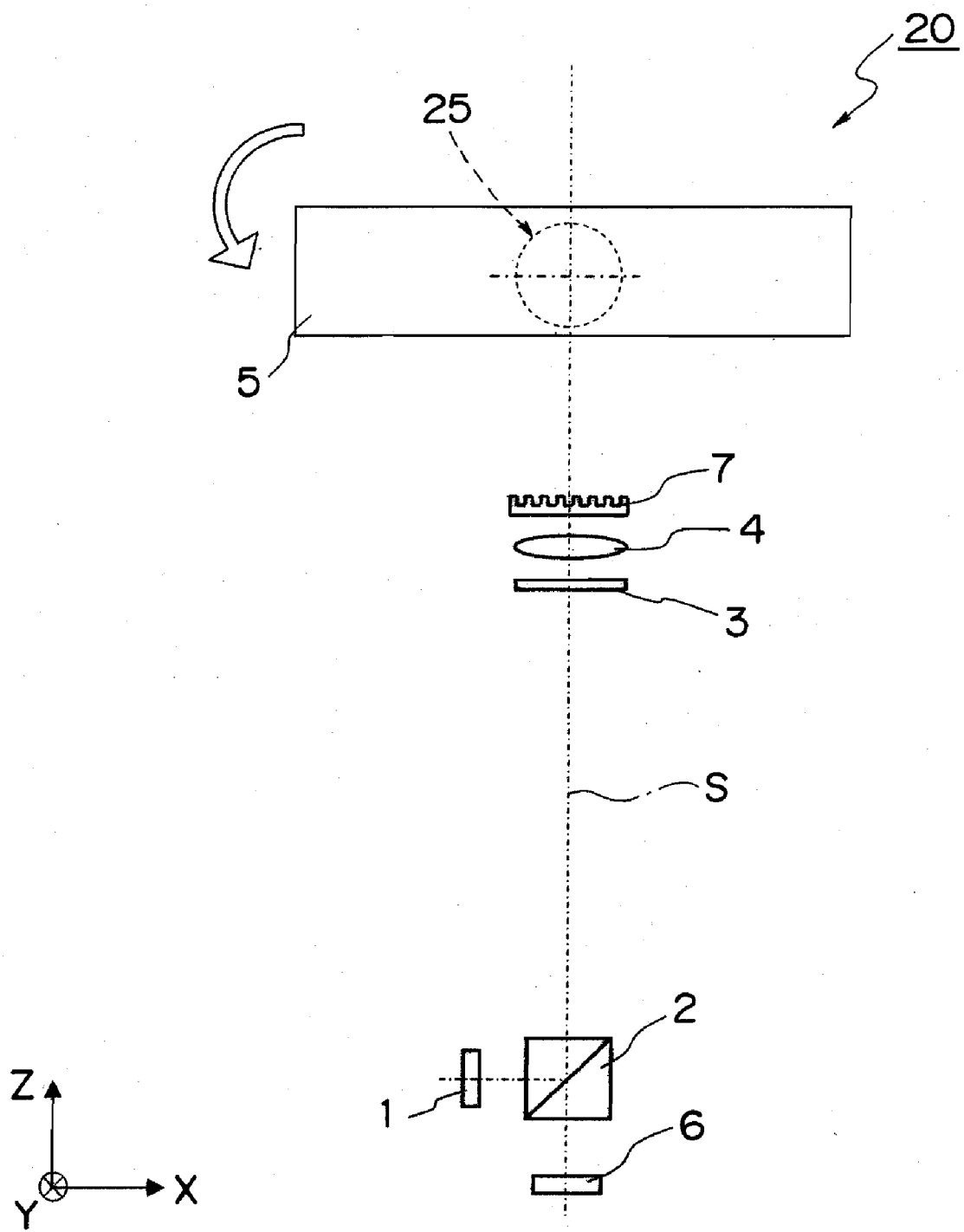
FIG. 6A is a schematic side view in the XZ plane of an angle measuring device according to a modification example of the first embodiment.
Figure 6B:
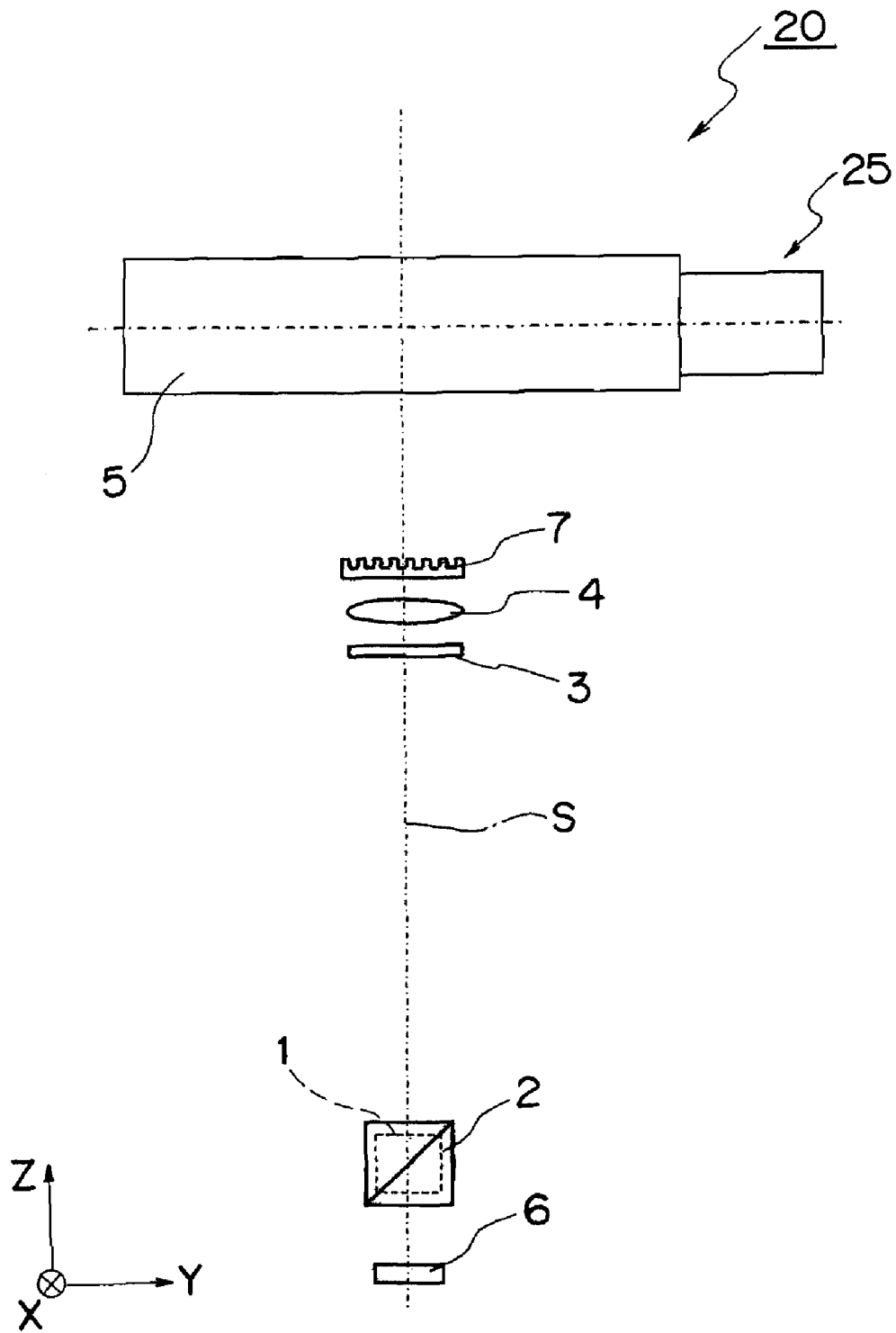
FIG. 6B is a schematic side view in the YZ plane of an angle measuring device according to the modification example of the first embodiment.

In contrast to this, when a construction such that the center of rotation of the retainer 25 is located inside the object 5 (i.e., when the object 5 rotates on its own axis) as in an angle measuring device 20 according to a modification example of the present first embodiment shown in FIGS. 6A and 6B, the flat surface 5a of the object 5 needs to be taken large. This is because, if the flat surface 5a is small, it becomes impossible to reliably reflect the diffracted light $D_m$ of each order. FIGS. 6A and 6B are views corresponding to FIGS. 3A and 3B, and like components are denoted by like reference numerals with no description provided therefor.

Figure 7:
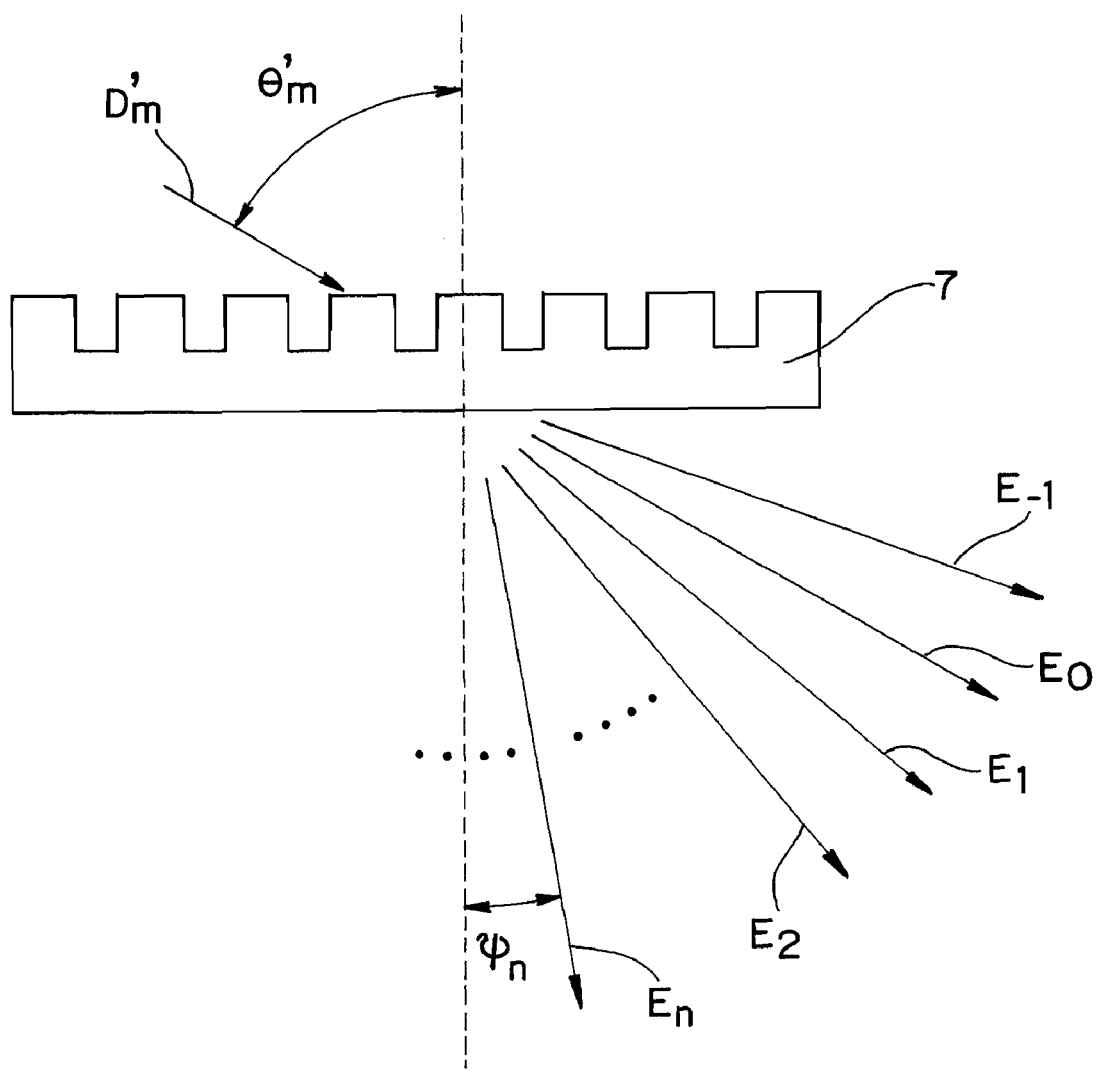
FIG. 7 is a schematic explanatory view showing a state in which the reflected light is rediffracted by the transmission diffraction grating in the angle measuring device of the first embodiment.

FIG. 7 is a schematic explanatory view showing a state in which the reflected light from the object 5 is diffracted by the transmission diffraction grating 7 in the angle measuring device 10 of the present first embodiment.

In FIG. 7, assuming that the angle of the n-th order diffraction light $E_n$ obtained after the reflected light $D_m'$ on the object 5 is incident on the transmission diffraction grating 7 and rediffracted is $\psi_n$, then the relation between $\theta_m'$ and $\psi_n$ is expressed by the equation: $\sin\theta_m' - \sin\psi_n = n(\lambda/d)$. In this case, in order to perform measurement with a sufficient resolving power from the size and the focal distance of the photodetector 6, the laser light incident on the photodetector 6 needs to satisfy the expressions: $\psi_n \approx 0$ and $\theta_m' \approx \theta_m$. If the relation and the aforementioned equation are used, the expression: $m \approx n$ holds, and n can be obtained. Moreover, assuming that the focal distance of the collimator lens 4 is f, and a deviation from the zero point (position of the optical axis S) of the image location on the photodetector 6 is l, then $\psi_n$ can be obtained by the equation: $\tan\psi_n = l/f$.

By coordinating the above equations, the angle $\phi$ of the object 5 can be measured by the Equation (2).

$$\phi = \{\sin^{-1}(m(\lambda/d)) + \sin^{-1}(m(\lambda/d) + \sin(\tan^{-1}(l/f)))\}/2 \quad (2)$$

Assuming that m=0 in the above equation (2), then the same as in the conventional optical lever system results. In this case, assuming that the position l of the photodetector 6 is expressed by the expression: $l_{min} \leq l \leq l_{max}$, then the angle range $\phi$ measurable by the conventional optical lever system becomes as expressed by Equation (3).

$$\tan^{-1}(l_{min}/f)/2 \leq \phi \leq \tan^{-1}(l_{max}/f)/2 \quad (3)$$

In contrast to this, since the angle measuring device 10 of the present first embodiment uses light up to the ±m-th order diffracted light $D_m$, the measurable angle range $\phi$ becomes as expressed by Equation (4).

$$\{\sin^{-1}(-m(\lambda/d)) + \sin^{-1}(-m(\lambda/d) + \sin(\tan^{-1}(l_{min}/f)))\}/2 \leq \phi \leq \{\sin^{-1}(m(\lambda/d)) + \sin^{-1}(m(\lambda/d) + \sin(\tan^{-1}(l_{max}/f)))\}/2 \quad (4)$$

Accordingly, the angle measuring device 10 of the present first embodiment can measure an angle in a wide range, which has not been able to be measured by the conventional optical lever system, by using the transmission diffraction grating 7 while keeping a resolving power equivalent to that of the conventional optical lever system. Moreover, such a device construction needs not to increase the size of the device, and a compact device can be provided.

In this case, the angle of the object 5 is calculated by using a concrete numerical example. For example, it is considered a case where laser light L1 of a wavelength $\lambda$=780 nm, a transmission diffraction grating 7 of a pitch d=50 μm and a collimator lens 4 of a focal distance f=0.5 mm are used, and the result of measuring the order of light received by the photodetector 6 is the positive third-order diffracted light formed as an image in a position located apart by l=1 mm from the position where the zeroth-order diffracted light is formed as an image. In this case, according to Equation (2), the angle $\phi$ of the object 5 is obtained as 36.4706 degrees. It is noted that the order of the diffracted light is specified by inputting the rotation position information of the retainer 15 to the controller 9 and reading the order specifying information related to the rotation position information from the storage section 13 by the angle calculating section 12. Further, the angle calculating section 12 calculates the angle of the object 5 by using Equation (2) on the basis of the image location information inputted from the photodetector 6 and the specified order.

Therefore, if Equation (2) is used, the angle of the object 5 is obtained as 36 degrees.

It is noted that the angle measuring device 10 of the present first embodiment is not limited to the construction as described above, and various modification examples can be considered.

Figure 8:
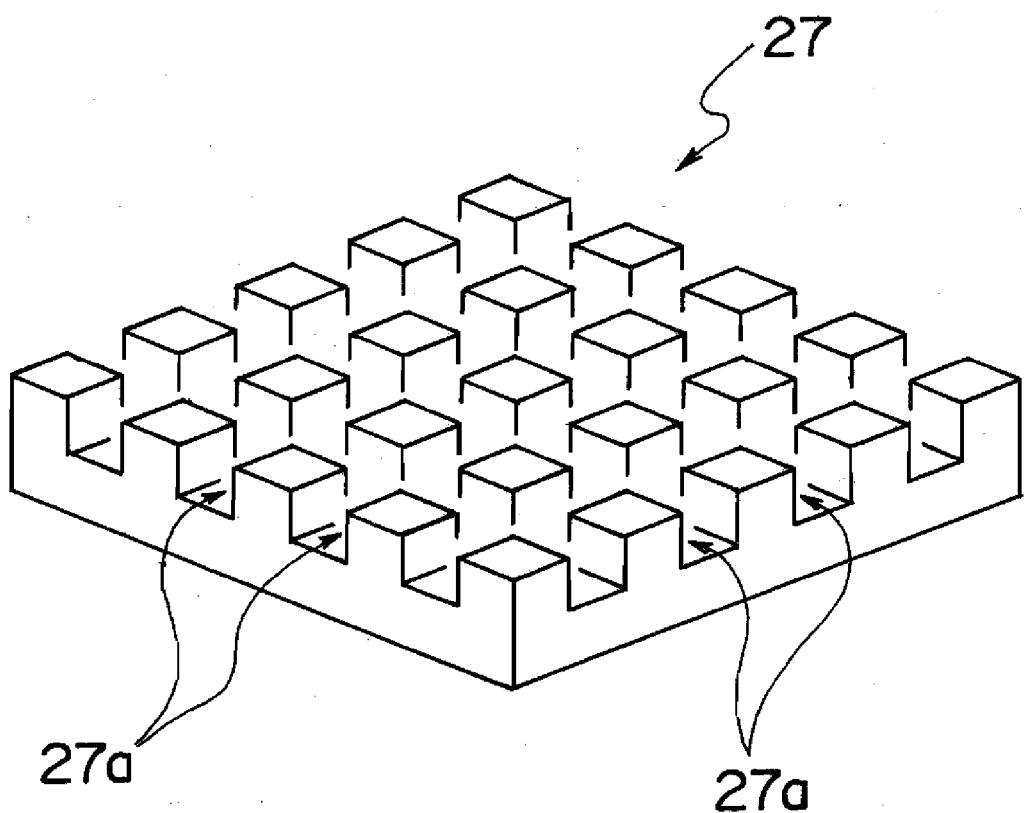
FIG. 8 is a schematic perspective view of a transmission diffraction grating according to the modification example of the first embodiment.

For example, although the case where the object 5 is rotated around the Y axis and its angle is measured has been described in the above description, it is possible to measure the angle even in a case where the object 5 is rotated around the Y axis and around the X axis. In such a case, by providing the angle measuring device with a diffraction grating 27 in which a plurality of groove portions 27a are formed in a grid shape so as to intersect one another as shown in FIG. 8 in place of the transmission diffraction grating 7 where the linear groove portions 7a are formed in one direction as shown in FIG. 2, the angle can be measured by using the amounts of shifts in the X-axis direction and the Y-axis direction of the image location in the photodetector 6.

Figure 9:
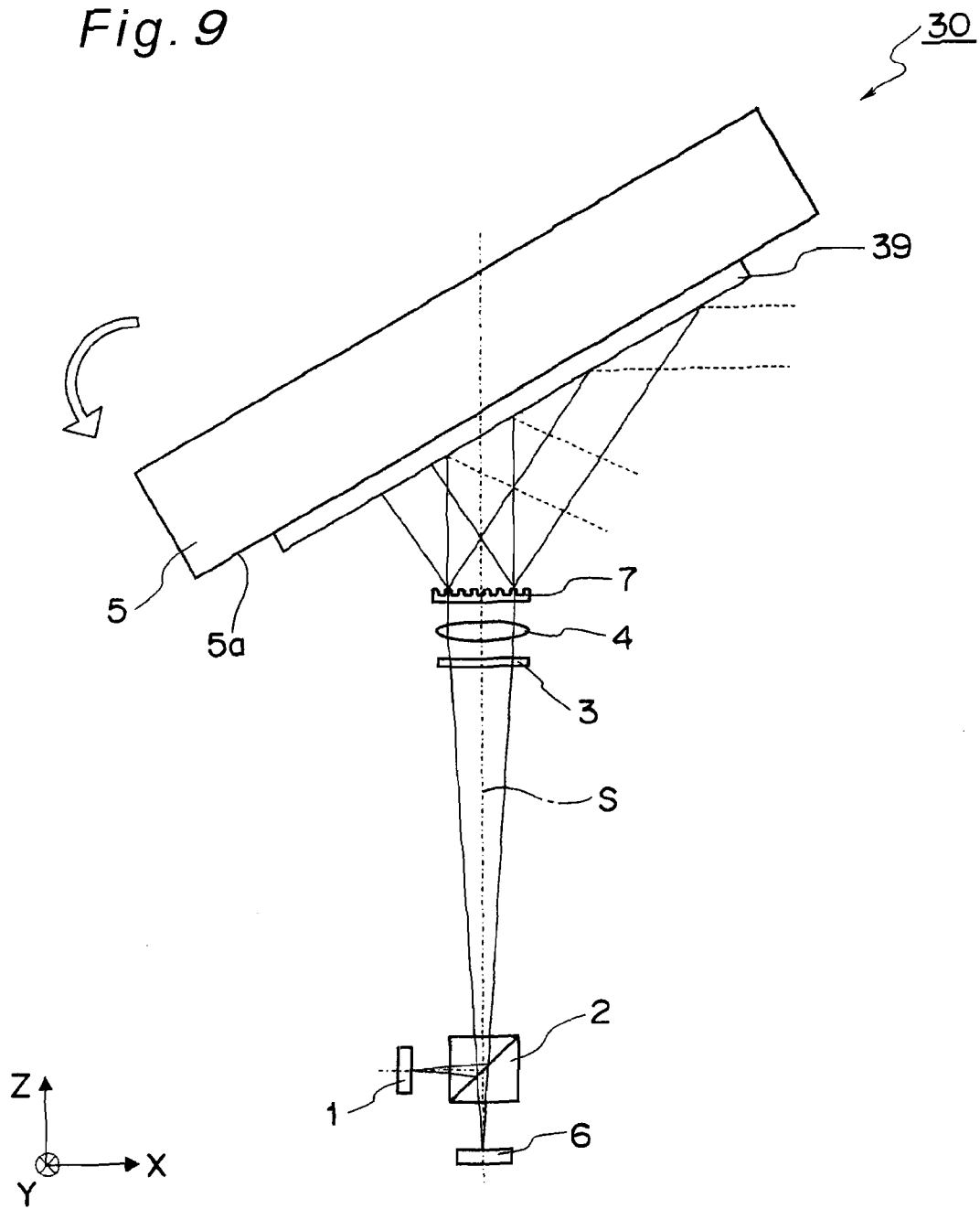
FIG. 9 is a schematic structural view of an angle measuring device according to a modification example of the first embodiment.

Moreover, as in an angle measuring device 30 according to a modification example as shown in FIG. 9, a construction such that a mirror 39 of an optical reflection member is placed on the flat surface 5a of the object 5 can also be adopted. By adopting the construction as described above, the diffracted light can effectively be reflected by using the mirror 39 even when the flat surface 5a of the object 5 is not flat or has a low reflectance, and the measurement of the angle of the object 5 becomes possible. It is noted that the relative positional relation between the mirror 39 and the object 5 needs to be grasped in such a construction. It is noted that the same components as the components provided for the angle measuring device 10 of FIG. 1 are denoted by the same reference numerals with no description provided therefor.

The Second Embodiment

Figure 10:
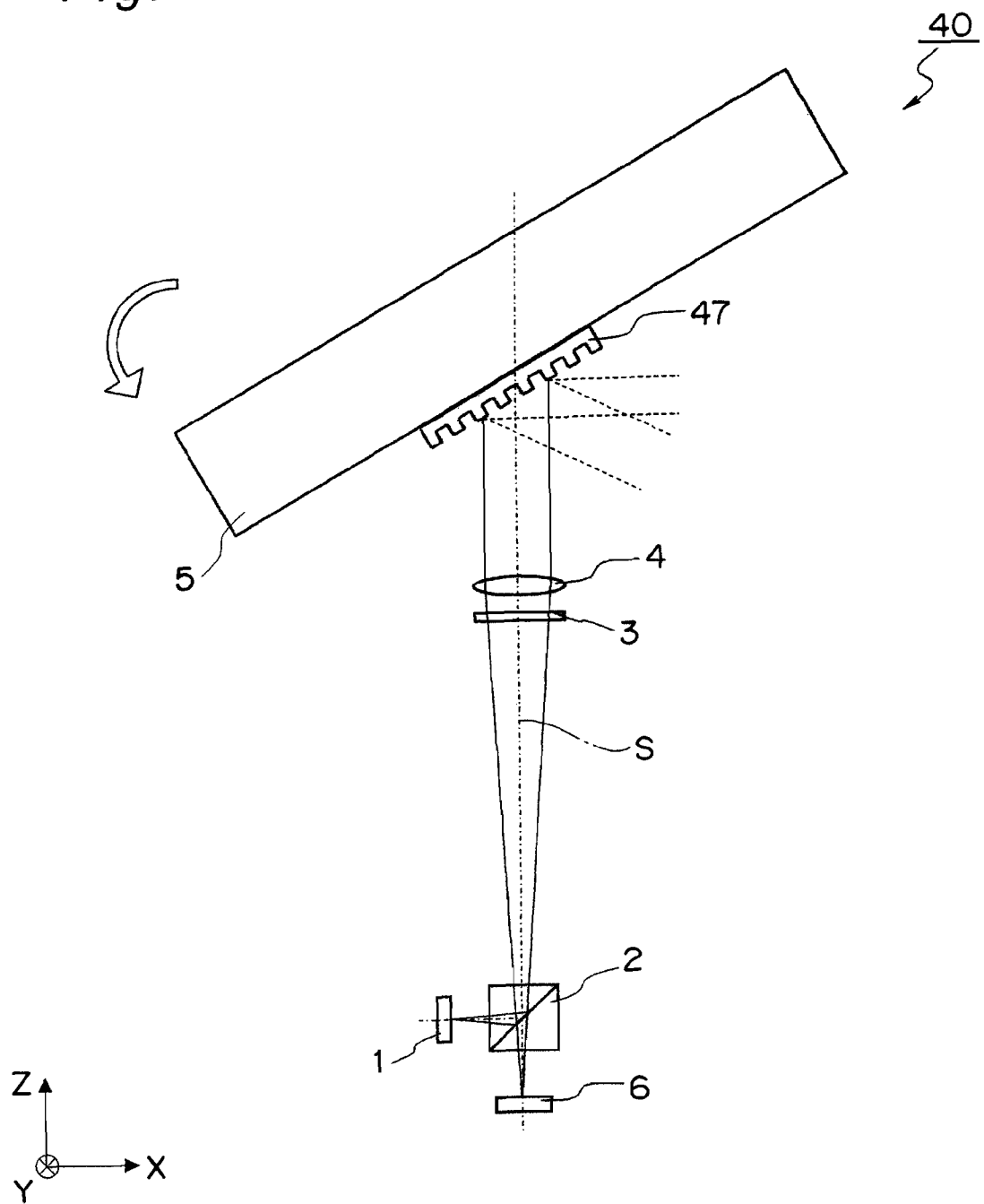
FIG. 10 is a schematic structural view of an angle measuring device according to a second embodiment of the present invention.

FIG. 10 is a schematic structural view of an angle measuring device 40 according to the second embodiment of the present invention. In the angle measuring device 40 of the present second embodiment of FIG. 10, the same components as the components provided for the angle measuring device 10 of the first embodiment of FIG. 1 are denoted by the same reference numerals with no description provided therefor.

As shown in FIG. 10, the angle measuring device 40 employs a reflection diffraction grating 47 instead of the transmission type as a diffraction grating, and the reflection diffraction grating 47 is further placed on the flat surface 5a of the object 5. Although a retainer that retains and rotates the object 5 is provided for the angle measuring device 40, the retainer is not shown in FIG. 10.

In the angle measuring device 40 constructed as above, as shown in FIG. 10, laser light L1 emitted from a light source 1 is reflected on a beam splitter 2 and transmitted through a quarter wavelength plate 3. The laser light L1 transmitted through the quarter wavelength plate 3 is formed into parallel light L2 by a collimator lens 4 and made incident on the reflection diffraction grating 47 placed on the object 5 so as to be along the flat surface 5a of the object 5 and arranged on the optical axis S. The parallel light L2 is made to diverge into diffracted lights D of different orders by the reflection diffraction grating 47, and the diffracted lights D are reflected. A diffracted light D of at least one order of the reflected diffracted lights D is made incident on the collimator lens 4. The light is condensed by the collimator lens 4, transmitted through the quarter wavelength plate 3 and the beam splitter 2 and formed as an image on a photodetector 6.

Concrete dimensions of the angle measuring device 40 constructed as above are described with reference to FIG. 10. The dimensions of the beam splitter 2 are 20 mm in the X-axis direction and 30 mm in the Z-axis direction in FIG. 10. Both the distance between the light source 1 and the beam splitter 2 and the distance between the photodetector 6 and the beam splitter 2 are each 10 mm. The distance between the photodetector 6 and the collimator lens 4 is 300 mm. The effective diameter of the collimator lens 4 is 10 mm, and the focal distance of the collimator lens 4 is f=300. The width in the X-axis direction of the reflection diffraction grating 47 is 20 mm, and the pitch of the diffraction grating 47 is 37 μm. The distance between the collimator lens 4 and the diffraction grating 47 is 100 mm.

Although it is possible that a stray light is generated since diffraction is caused two times by the transmission diffraction grating 7 and made incident on the photodetector 6 in the angle measuring device 10 of the first embodiment, diffraction is caused one time by using the reflection diffraction grating 47 in the angle measuring device 40 of the present second embodiment. Therefore, the possibility of the incidence of the stray light on the photodetector 6 is made lower than in the device of the first embodiment, and the frequency of the diffraction can be reduced. Therefore, the intensity of the laser light emitted from the light source 1 can be reduced, allowing the energy conservation and device cost reduction to be achieved. Moreover, the angle measuring device 40 can measure the light reflected consistently in an identical position on the object 5 although the order is different. Therefore, even when the surface of the object 5 is not uniform, the angle can accurately be measured. However, in this case, the center of rotation of the object 5 needs to exist inside the object 5. On the other hand, since the reflection diffraction grating 47 needs to be placed on the object 5 in the device 40 of the present second embodiment, it is sometimes the case where the reflection diffraction grating 47 cannot be placed depending on the material of the surface of the object 5. In such a case, the construction of the device 10 of the first embodiment should preferably be adopted.

The Third Embodiment

Figure 11:
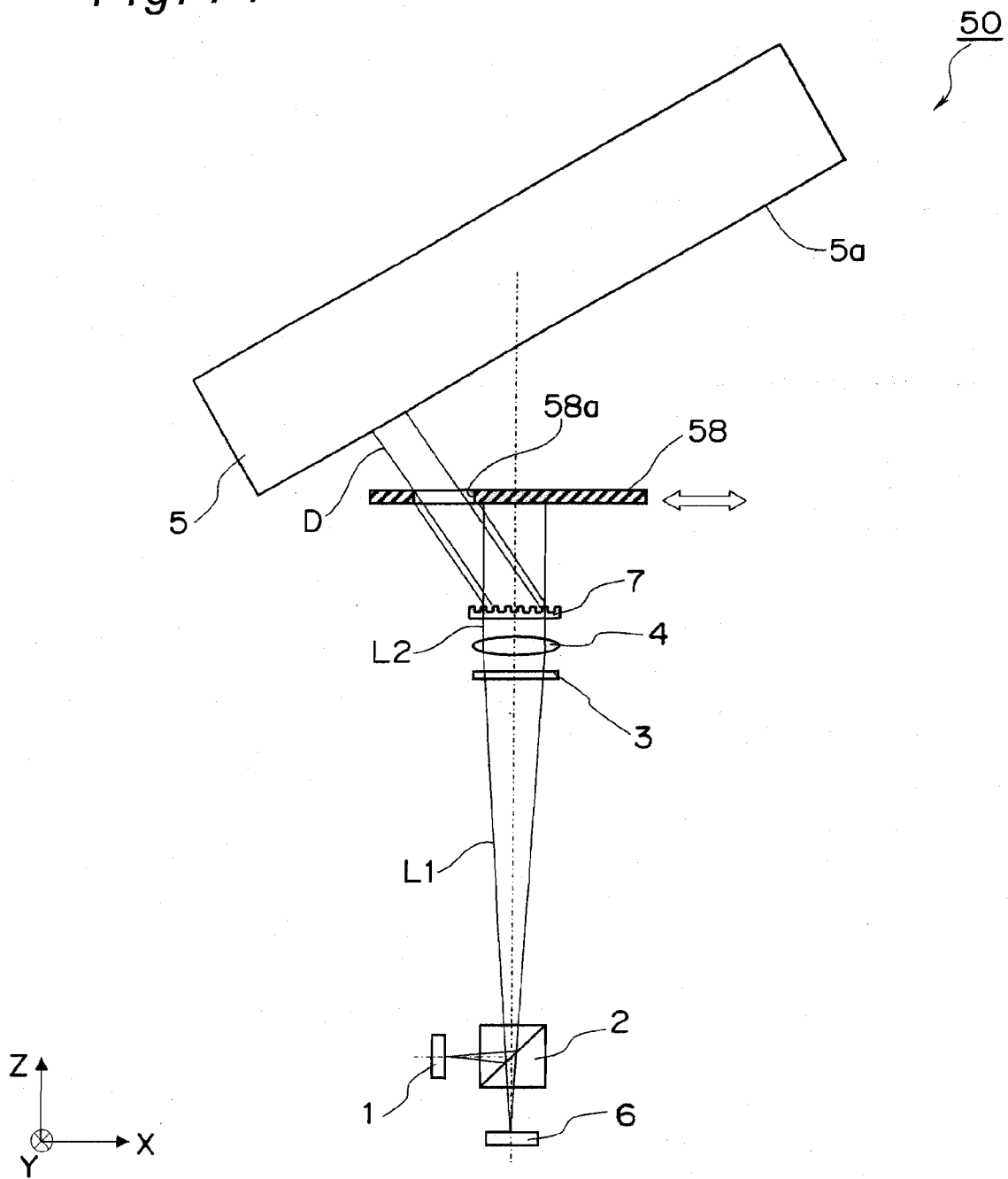
FIG. 11 is a schematic structural view of an angle measuring device according to a third embodiment of the present invention.

FIG. 11 is a schematic structural view of an angle measuring device 50 according to the third embodiment of the present invention. In the angle measuring device 50 of the present third embodiment of FIG. 11, the same components as the components provided for the angle measuring device 10 of the first embodiment of FIG. 1 are denoted by the same reference numerals with no description provided therefor.

As shown in FIG. 11, the angle measuring device 50 has a movable slot member 58 that is one example of the light shielding member where a slit portion (slit-shaped opening portion) 58a of a light passing portion is formed. The movable slit member 58 has a function to limit the passing of diffracted light therethrough by passing a definite diffracted light through the slit portion 58a and interrupting the other diffracted lights without allowing the passing of the diffracted light in the peripheries. Moreover, the movable slit member 58 can be shifted in the illustrated X-axis direction by a shifter (not shown) and is made to selectively allow the diffracted light of a certain order to pass therethrough by changing the relative positional relation between the slit portion 58a and the transmission diffraction grating 7 by the shift described above.

According to the angle measuring device 50 of the construction, as shown in FIG. 7, laser light L1 emitted from the light source 1 is reflected on the beam splitter 2 and transmitted through the quarter wavelength plate 3. The light L1 transmitted through the quarter wavelength plate 3 is formed into parallel light L2 by the collimator lens 4 and made incident on the transmission diffraction grating 7 placed to be perpendicular to the parallel light L2. The parallel light L2 is made to diverge into diffracted lights D of different orders by the transmission diffraction grating 7. Subsequently, the diffracted light D is incident on the movable slit member 58 placed in a position located apart from the transmission diffraction grating 7 to an extent that the diffracted lights D of orders do not interfere with one another. Only the light, which has passed through the slit portion 58a formed at the movable slit member 58, of the diffracted lights D is applied to the flat surface 5a of the object 5. The greater part of the diffracted light reflected on the flat surface 5a of the object 5 scatters without being incident on the transmission diffraction grating 7. However, light of at least one order of the diffracted lights D reflected on the flat surface 5a of the object 5 is reincident on the transmission diffraction grating 7 after passing through the slit portion 58a. The light is rediffracted by the transmission diffraction grating 7, condensed by the collimator lens 4, transmitted through the quarter wavelength plate 3 and the beam splitter 2 and formed as an image on the photodetector 6.

According to the angle measuring device 50 of the present third embodiment, the device becomes complicated since the movable mechanism is further added to the angle measuring device 10 of the first embodiment. However, if the relation between the position of the slit portion 58a of the movable slit member 58 and the order of the diffracted light, i.e., order specifying information is preparatorily obtained, the light incident on the photodetector 6 among the lights diffracted by the transmission diffraction grating 7 can be specified by shifting the movable slit member 58 in a direction perpendicular to the optical axis S, and the angle can be measured without counting the order of the diffracted light from the specified order. By thus preparatorily obtaining and keeping the order specifying information that relates the position of the slit portion 58a with the order of the diffracted light, the order can be specified without moving the object 5.

Moreover, a liquid crystal device can be used in place of the movable slit member 58 and the shifter that shifts the movable slit member 58. The liquid crystal device is able to electrically form a region that allows light to pass and a region that does not allow light to pass and to form the regions in the desired places. Using such a liquid crystal device obviates the need for the shifter or the like and allows the device construction to be simplified and reduced in size.

The Fourth Embodiment

Figure 12A:
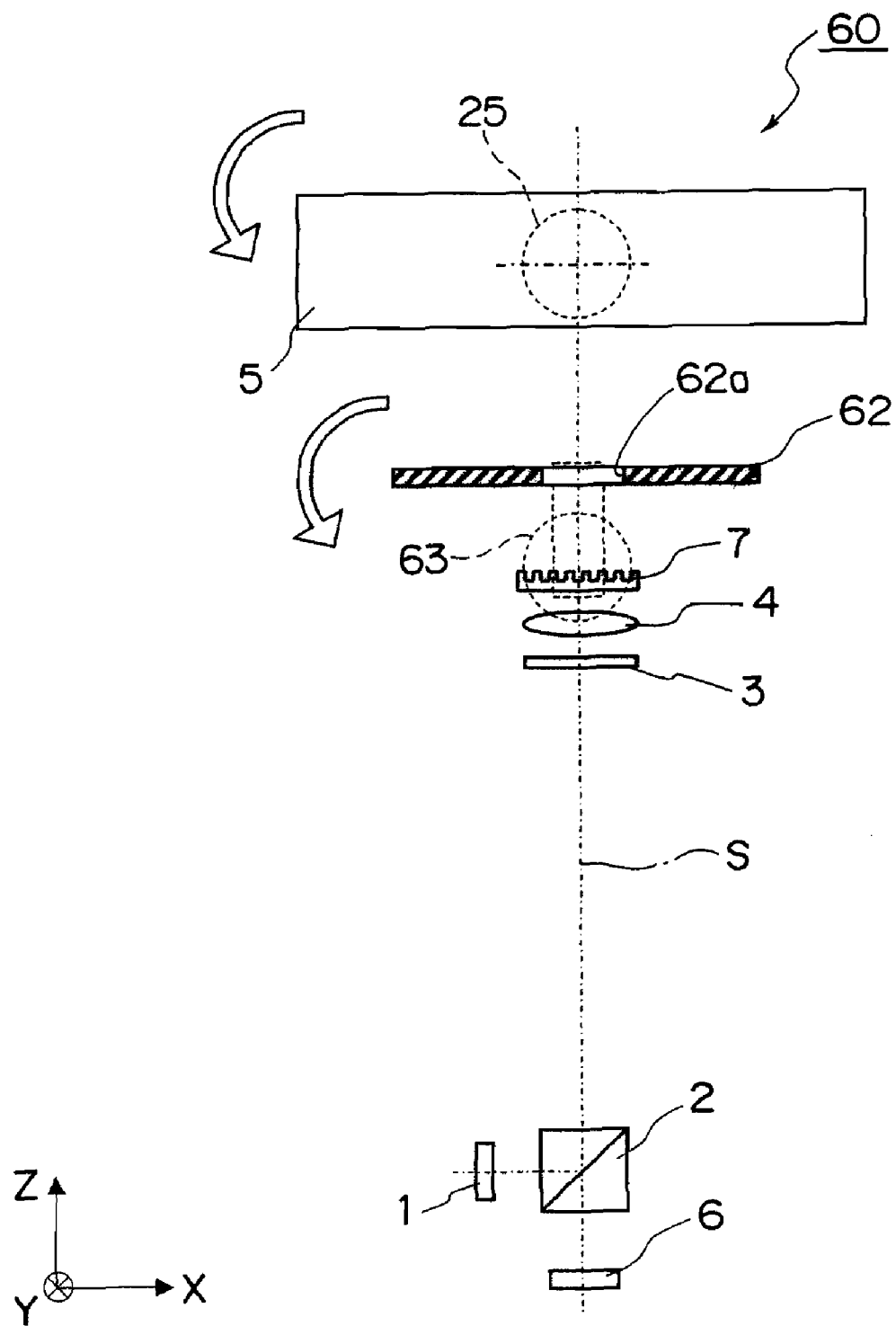
FIG. 12A is a schematic side view in the XZ plane of an angle measuring device according to a fourth embodiment of the present invention.
Figure 12B:
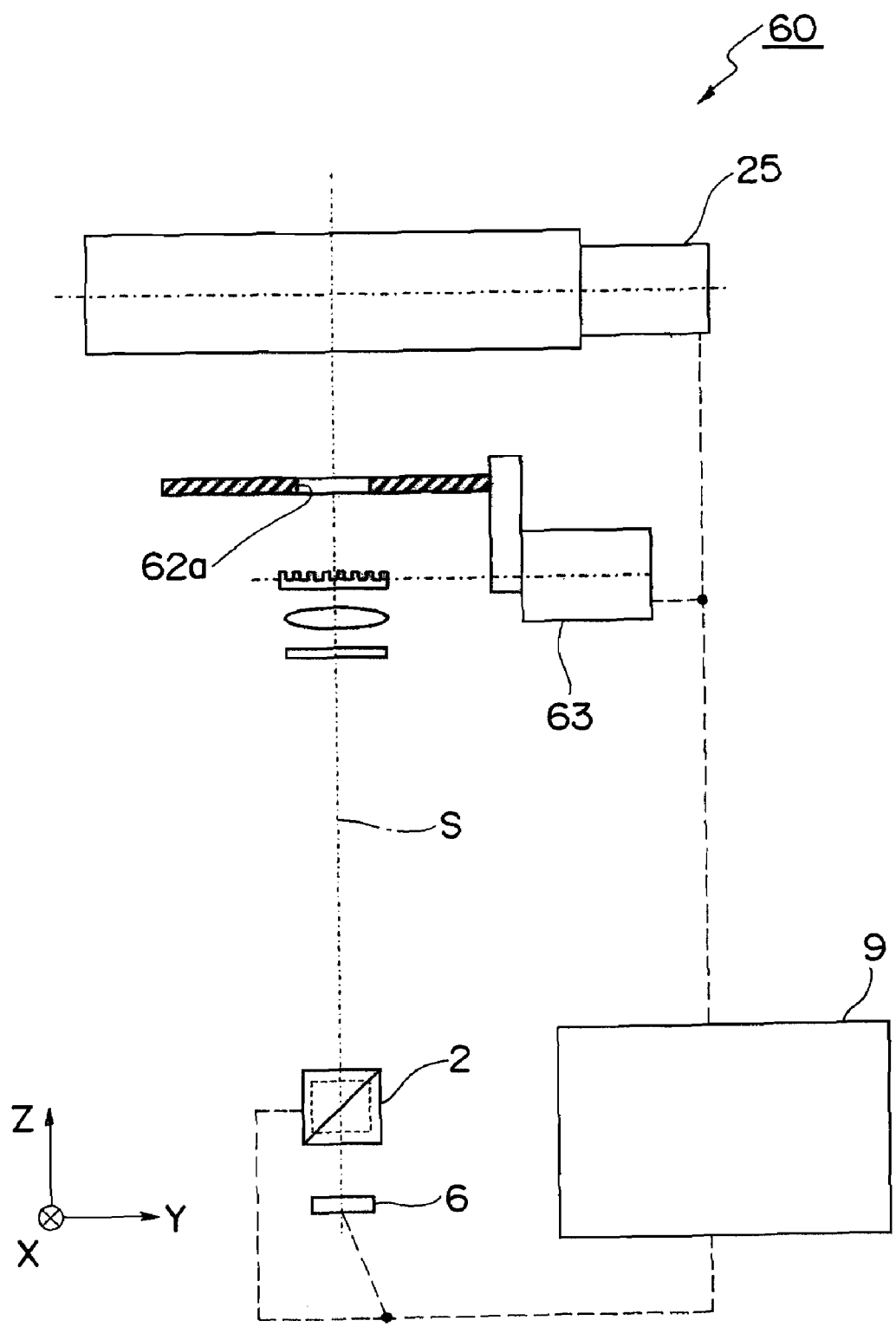
FIG. 12B is a schematic side view in the YZ plane of the angle measuring device of the fourth embodiment.

FIGS. 12A and 12B are schematic structural views of an angle measuring device 60 according to the fourth embodiment of the present invention, corresponding to FIGS. 3A and 3B that show the angle measuring device 10 of the first embodiment. In the angle measuring device 60 of the present fourth embodiment of FIGS. 12A and 12B, the same components as the components provided for the angle measuring device 10 of the first embodiment of FIGS. 3A and 3B are denoted by the same reference numerals with no description provided therefor.

As shown in FIGS. 12A and 12B, the angle measuring device 60 comprises a light shielding member with a slit portion 62a placed in between the transmission diffraction grating 7 and the object 5 as a rotary slit member 62 that can be rotationally moved. The rotary slit member 62 is rotationally driven by a rotator 63 around the center of rotation arranged to coincide with the center of the transmission diffraction grating 7. By thus rotationally moving the rotary slit member 62, a diffracted light of a certain order, among the diffracted lights diffracted by the transmission diffraction grating 7, can selectively be made to pass.

Figure 13:
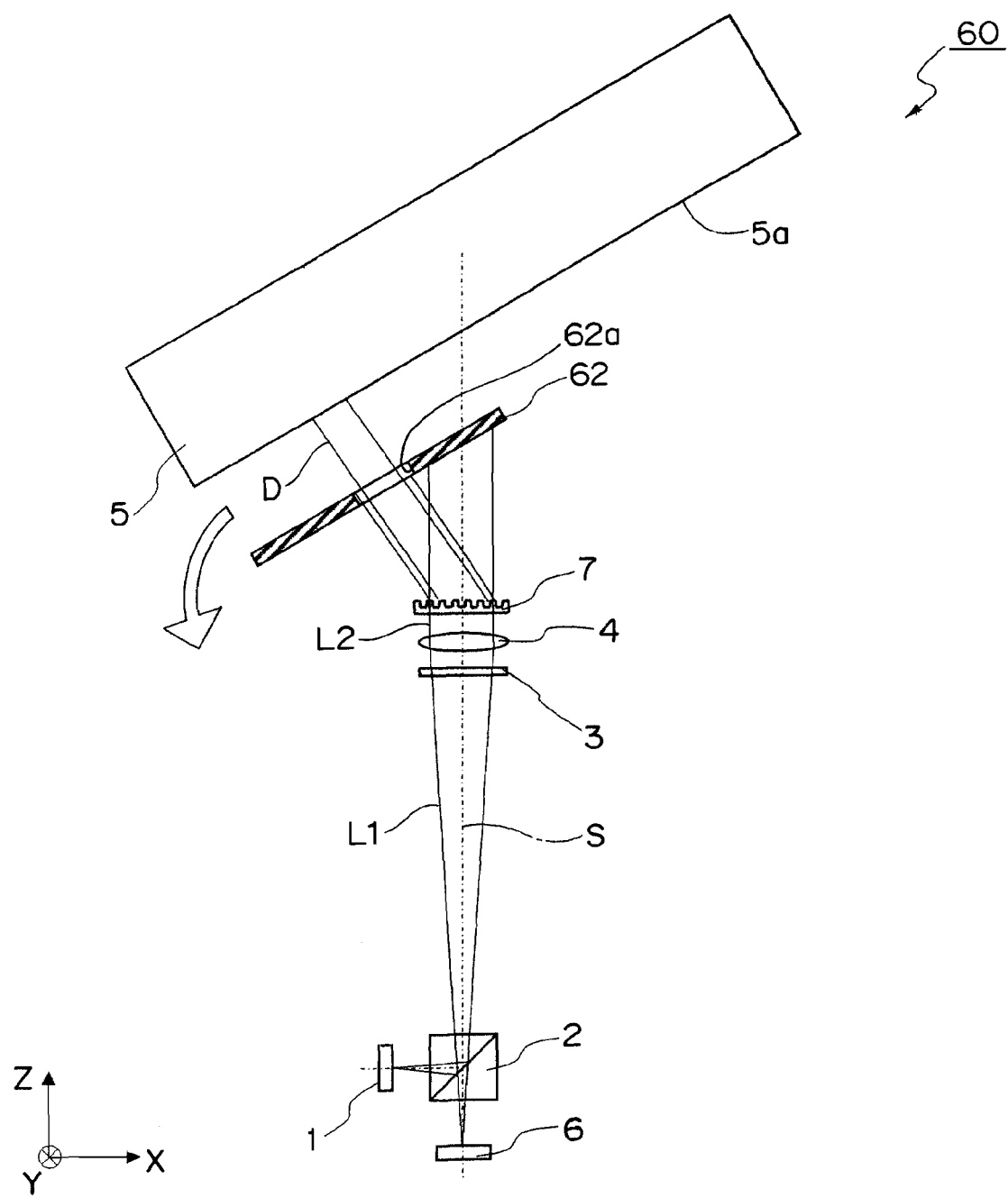
FIG. 13 is a schematic explanatory view showing a state in which a rotary slit member is rotated in the angle measuring device of the fourth embodiment.
Figure 14:
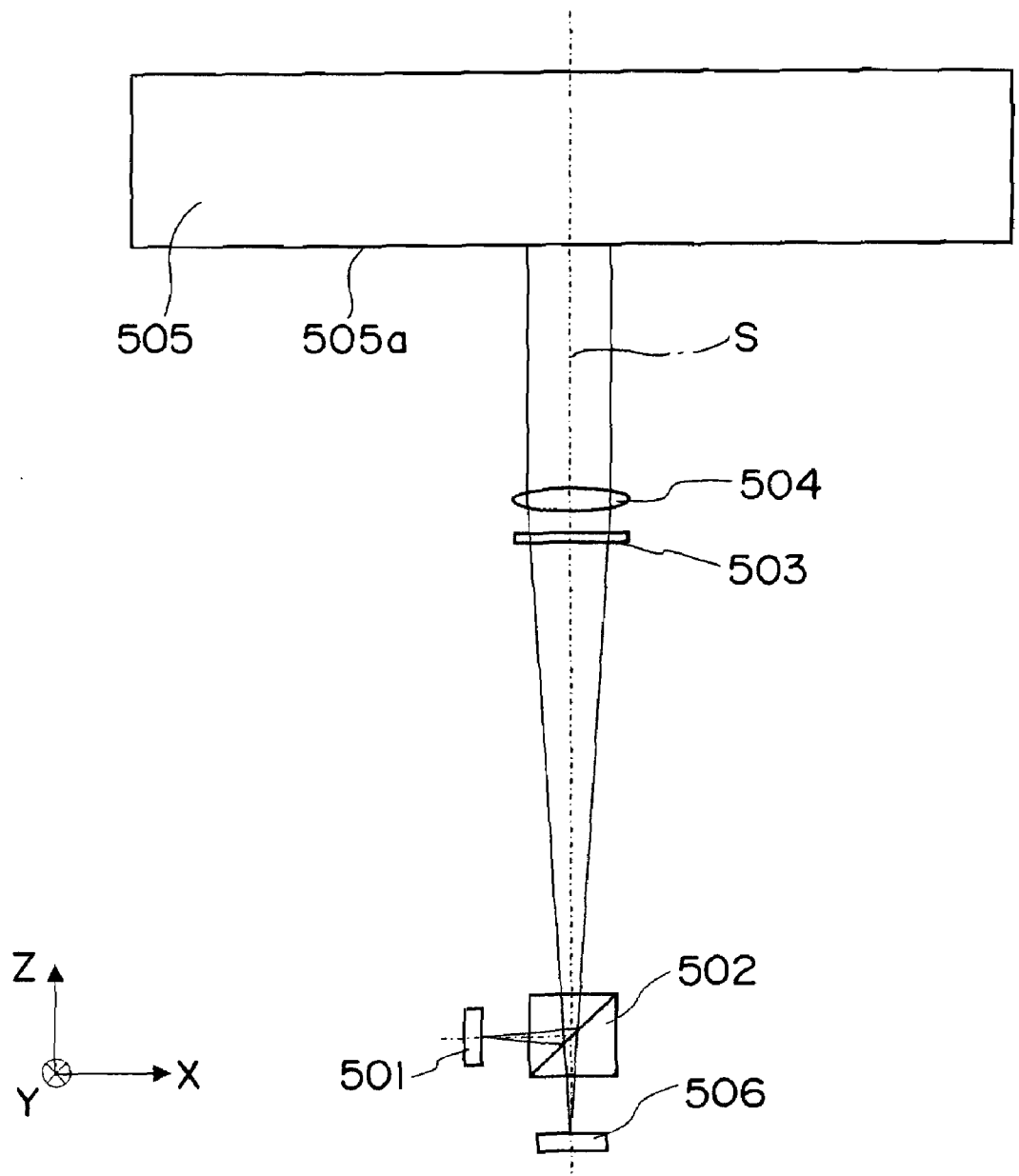
FIG. 14 is a schematic structural view of a conventional angle measuring device.

FIG. 13 is a schematic explanatory view showing a state in which only diffracted light of a certain order is made to pass by rotationally moving the rotary slit member 62 in the angle measuring device 60 constructed as above. In FIG. 13, laser light L1 emitted from the light source 1 is reflected by the beam splitter 2 and transmitted through the quarter wavelength plate 3. The light L1 transmitted through the quarter wavelength plate 3 is formed into parallel light L2 by the collimator lens 4 and made incident on the transmission diffraction grating 7 placed to be perpendicular to the parallel light L2. The parallel light L2 is made to diverge into diffracted lights D of different orders by the transmission diffraction grating 7. Subsequently, the diffracted light D is incident on the rotary slit member 62 placed in a position located apart from the transmission diffraction grating 7 to an extent that the diffracted lights D of orders do not interfere with one another. From among the diffracted lights D of orders, only the light that has passed through the slit portion 62a formed at the rotary slit member 62 is applied to the flat surface 5a of the object 5. Although the greater part of the diffracted light reflected on the flat surface 5a of the object 5 scatters without being incident on the transmission diffraction grating 7, the light of at least one order of the diffracted lights D reflected on the flat surface 5a of the object 5 is reincident on the transmission diffraction grating 7 after passing through the slit portion 62a. The light is rediffracted by the transmission diffraction grating 7, condensed by the collimator lens 4, transmitted through the quarter wavelength plate 3 and the beam splitter 2 and formed as an image on the photodetector 6.

In this case, the rotary slit member 62 is rotated by the rotator 63 in a manner that a locus of a circular arc around the transmission diffraction grating 7 served as the center of rotation is drawn. By thus rotating the rotary slit member 62, passing and shielding of the diffracted light can effectively be performed. It is noted that the formation width of the slit portion 62a as described above should preferably be formed to a dimension approximately equal to the width of the parallel light that passes through the transmission diffraction grating 7.

By preparatorily obtaining the order specifying information that relates the rotation position of the rotary slit member 62 by the rotator 63 with the order of the diffracted light that passes through the slit portion 62a and keeping the information in the controller 9, the order of the diffracted light formed as an image on the photodetector 6 can be specified without moving the object 5.

Even when the angle of the object ranges in a wide range, the angle measuring device and the measuring method of the present invention can measure the angle without deteriorating the resolving power by using a small mechanism or a mechanism of a small movable scope. The angle measurement technique as described above can be applied to, for example, a device to measure the angle of an optical disk that has the possibility of the occurrence of a positional deviation in the surface position.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2005-273314 filed on Sep. 21, 2005, including specification, drawings and claims, are incorporated herein by reference in its entirety.

The invention claimed is:

1. An angle measuring device comprising:
a light source;
a photodetector;
a collimator lens to collimate light emitted from the light source along its optical axis;
a transmission diffraction grating which is placed in the optical axis, to make the parallel light passed through and make several lights of different orders;
an optical system to form diffracted light reflected on a flat surface of an object at the position facing the transmission diffraction grating into an image on the photodetector after making the light passed through the transmission diffraction grating;
a calculating device to calculate an angle of the object with respect to the optical axis using an image location on the photodetector and the order of the light formed as the image;
a rotator to rotate the object so that an angle of the flat surface with respect to the optical axis is changed; and
a controller which has order specifying information to relate a rotation position of the object by the rotator with each order of the diffracted light formed as an image on the photodetector, for specifying the order of the light formed as the image by rotation position information of the object and the order specifying information.

2. The angle measuring device as defined in claim 1, wherein the rotator is a device to rotate the object along a circular arc centered on the transmission diffraction grating.

3. The angle measuring device as defined in claim 1, wherein the rotator is a device to rotate the object around a center of rotation arranged inside the object.

4. An angle measuring device comprising:
a light source;
a photodetector;
a collimator lens to collimate light emitted from the light source along its optical axis;
a transmission diffraction grating which is placed in the optical axis, to make the parallel light passed through and make several lights of different orders;
an optical system to form diffracted light reflected on a flat surface of an object at the position facing the transmission diffraction grating into an image on the photodetector after making the light passed through the transmission diffraction grating;
a calculating device to calculate an angle of the object with respect to the optical axis using an image location on the photodetector and the order of the light formed as the image;
a light shielding member provided with a light transmitting portion, which is placed between the flat surface of the object and the transmission diffraction grating and which comprises a light passing portion, the light shielding member making a part of the diffracted lights of the orders pass through the light passing portion and shielding the other diffracted lights;

a shifter to shift the light shielding member and the transmission diffraction grating relatively in a direction intersecting the optical axis; and a controller which has order specifying information to relate a relative displacement position of the light shielding member by the shifter with each order of the diffracted light formed as an image on the photodetector, to specify the specific order of the diffracted light by relative displacement position information of the light shielding member and the order specifying information.

5. The angle measuring device as defined in claim 4, wherein the shifter is a device to shift the light shielding member along a circular arc centered on the transmission diffraction grating.

6. The angle measuring device as defined in claim 4, wherein the light passing portion of the light shielding member is a slit-shaped opening portion, where a slit of a width equal to a width of the parallel light transmitted through the transmission diffraction grating is formed.

7. An angle measuring device comprising:
a light source;
a photodetector;
a collimator lens to collimate light emitted from the light source along its optical axis;
a reflection diffraction grating which is placed on the optical axis and a flat surface of an object at the position facing the collimator lens, to reflect applied parallel light by making several lights of different orders;
an optical system to form the reflected diffracted light on the photodetector;
calculating device to calculate an angle of the object with respect to the optical axis using an image location on the photodetector and the order of the light formed as the image;
a rotator to rotate the object so that an angle of the flat surface with respect to the optical axis is changed; and
a controller which has order specifying information to relate a rotation position of the object by the rotator with each order of the diffracted light formed as an image on the photodetector, for specifying the order of the light formed as the image by rotation position information of the object and the order specifying information.

8. An angle measuring device comprising:
a light source;
a photodetector;
a collimator lens to collimate light emitted from the light source along its optical axis;
a reflection diffraction grating which is placed on the optical axis and a flat surface of an object at the position facing the collimator lens, to reflect applied parallel light by making several lights of different orders;
an optical system to form the reflected diffracted light on the photodetector; and
calculating device to calculate an angle of the object with respect to the optical axis using an image location on the photodetector and the order of the light formed as the image;
an angle calculating section in which, assuming that a focal distance of the collimator lens is f, a wavelength of the parallel light emitted from the lens is $\lambda$, an interval pitch of groove portions of the diffraction grating is d, a specific order of the diffracted light is m, and a distance between the optical axis and the image location position on the photodetector is l, then an angle $\phi$ of the object with respect to the optical axis of the lens is calculated by the equation:

$$\phi = \frac{\sin^{-1}\left(m\left(\frac{\lambda}{d}\right)\right) + \sin^{-1}\left(m\left(\frac{\lambda}{d}\right) + \sin\left(\tan^{-1}\left(\frac{l}{f}\right)\right)\right)}{2}.$$

9. An angle measuring method comprising:
transmitting parallel light through a diffraction grating and making several lights of different orders by the diffraction grating;
reflecting the diffracted light on a flat surface of an object;
making the reflected diffracted light pass through the diffraction grating and then forming the light into an image; and
calculating an angle of the object with respect to an optical axis of the parallel light using an image location and the order of the light formed as the image;
wherein a zeroth-order diffracted light is collimated as the image in a state in which the optical axis and the flat surface of the object are arranged perpendicular to each other, thereafter the diffracted lights whose orders are successively increased by one are each formed as the image by displacing the flat surface and the diffraction grating relatively to each other to change the angle of the flat surface with respect to the optical axis, by which order specifying information which relates a relative displacement position of the object with each order of the diffracted light formed as the image is obtained,
the order of the diffracted light formed as an image is specified by the order specifying information and relative displacement position information of the object, and the angle of the object is measured using an image location and the specified order.

10. The angle measuring method as defined in claim 9, wherein the relative displacement of the object with respect to the optical axis is to displace the object along a circular arc centered on the diffraction grating.

11. The angle measuring method as defined in claim 9, wherein the relative displacement of the object with respect to the optical axis is to rotate the object around a center of rotation arranged inside the object.

12. An angle measuring method comprising:
transmitting parallel light through a diffraction grating and making several lights of different orders by the diffraction grating;
reflecting the diffracted light on a flat surface of an object;
making the reflected diffracted light pass through the diffraction grating and then forming the light into an image; and
calculating an angle of the object with respect to an optical axis of the parallel light using an image location and the order of the light formed as the image;
wherein a light shielding member provided with a light transmitting portion, which is placed between the flat surface of the object and the diffraction grating and which comprises a light passing portion, the light shielding member making part of the diffracted lights of the orders pass through the light passing portion and shielding the other diffracted lights, is moved in a direction intersecting the optical axis with respect to the diffraction grating while successively forming the diffracted lights of the orders each into an image and order specifying information that relates a relative displacement position of the light shielding member with each order of the diffracted light formed as the image is to obtained, and the specific order of the diffracted light is specified by the obtained order specifying information and relative displacement position information of the light shielding member, and the angle of the object is calculated on a basis of an image location and the specified order.

13. The angle measuring method as defined in claim 12, wherein the relative displacement of the light shielding member with respect to the diffraction grating is to move the light shielding member along a circular arc centered on the diffraction grating.

14. An angle measuring method comprising:

reflecting parallel light applied to a diffraction grating placed on a flat surface of an object and diffracting the light into lights of different orders by the diffraction grating;

focusing the reflected diffracted light and forming the light into an image; and calculating an angle of the object with respect to an optical axis of the parallel light on a basis of an image location of the light and the order of the light, wherein a zeroth-order diffracted light is collimated as the image in a state in which the optical axis and the flat surface of the object are arranged perpendicular to each other, thereafter the diffracted lights whose orders are successively increased by one each formed as the image by displacing the flat surface and the diffraction grating relatively to each other to change the angle of the flat surface with respect to the optical axis, by which order specifying information which relates a relative displacement position of the object with each order of the diffracted light formed as the image is obtained, the order of the diffracted light formed as an image is specified by the order specifying information and relative displacement position information of the object, and the angle of the object is measured using an image location and the specified order.

15. An angle measuring method comprising:

reflecting parallel light applied to a diffraction grating placed on a flat surface of an object and diffracting the light into lights of different orders by the diffraction grating;

focusing the reflected diffracted light and forming the light into an image; and calculating an angle of the object with respect to an optical axis of the parallel light on a basis of an image location of the light and the order of the light, wherein:

formation of the parallel light and the condensation and image formation of the diffracted light of the specific order are performed by using a collimator lens, and assuming that a focal distance of the collimator lens is f, a wavelength of the parallel light emitted from the lens is $\lambda$, an interval pitch of groove portions of the diffraction grating is d, a specific order of the diffracted light is m, and a distance between the optical axis and the image location is l, then an angle $\phi$ of the object with respect to the optical axis is calculated by the equation:

$$\phi = \frac{\sin^{-1}\left(m\left(\frac{\lambda}{d}\right)\right) + \sin^{-1}\left(m\left(\frac{\lambda}{d}\right) + \sin\left(\tan^{-1}\left(\frac{l}{f}\right)\right)\right)}{2}.$$

* * * * *